(12) United States Patent
Mulloy

(10) Patent No.: US 9,849,317 B2
(45) Date of Patent: Dec. 26, 2017

(54) DUCT SYSTEMS INCLUDING SHIELD AND FLANGE SUPPORT

(71) Applicant: HONEYWELL INTERNATIONAL INC., Morristown, NJ (US)

(72) Inventor: Patrick S. Mulloy, Chandler, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 0 days.

(21) Appl. No.: 14/604,899

(22) Filed: Jan. 26, 2015

(65) Prior Publication Data

US 2016/0213962 A1 Jul. 28, 2016

(51) Int. Cl.
| | | |
|---|---|---|
| *A62C 3/07* | (2006.01) |
| *F16L 23/00* | (2006.01) |
| *F16L 57/04* | (2006.01) |
| *F16L 23/14* | (2006.01) |

(52) U.S. Cl.
CPC ............. *A62C 3/07* (2013.01); *F16L 23/003* (2013.01); *F16L 23/14* (2013.01); *F16L 57/04* (2013.01)

(58) Field of Classification Search
CPC . F16L 23/0286; F16L 2323/032; F16L 23/14; F16L 57/04; F16L 23/003; F16L 23/16; F16L 57/162; F16L 23/165; F16L 23/22; F16L 2323/24; A62C 3/07
USPC ................... 285/363, 364, 405, 424
See application file for complete search history.

(56) References Cited

U.S. PATENT DOCUMENTS

| | | | | |
|---|---|---|---|---|
| 2,916,054 A | | 12/1959 | Callan | |
| 3,198,561 A | * | 8/1965 | Witt ......................... | F16L 23/14 138/158 |
| 3,630,549 A | * | 12/1971 | Grimm ................... | F16L 23/14 285/296.1 |
| 3,873,102 A | * | 3/1975 | Lotze ...................... | F16L 23/22 136/233 |
| 4,087,624 A | * | 5/1978 | Hitchcock ................ | A62C 3/16 169/48 |
| 4,288,115 A | * | 9/1981 | Sullivan .................. | F16L 23/14 285/363 |
| 4,410,206 A | * | 10/1983 | Mez ........................ | F16L 23/14 285/405 |
| 4,566,724 A | * | 1/1986 | Arnoldt ................... | F16L 23/14 285/364 |
| 4,865,365 A | * | 9/1989 | Meinig .................... | F16L 23/14 138/109 |
| 5,054,823 A | * | 10/1991 | Arnoldt ................... | F16L 23/14 285/363 |
| 5,133,580 A | | 7/1992 | Meinig | |
| 5,165,736 A | * | 11/1992 | De Waal ............. | F24F 13/0209 285/363 |
| 5,275,449 A | * | 1/1994 | Hunter .................... | F16L 23/14 285/363 |

(Continued)

OTHER PUBLICATIONS

Extended EP Search Report for Application No. EP 16152329.5-1754 dated Jul. 7, 2016.

*Primary Examiner* — Brian Glessner
*Assistant Examiner* — Adam Barlow
(74) *Attorney, Agent, or Firm* — Lorenz & Kopf, LLP

(57) ABSTRACT

Apparatus are provided for a shield and flange support for a duct. The shield and flange support includes a first side and a second side coupled to the first side to extend toward the duct. The first side and the second side cooperate to define a cavity, and the cavity includes at least one of a first insulating fluid and a first insulating solid.

18 Claims, 14 Drawing Sheets

(56) References Cited

U.S. PATENT DOCUMENTS

| | | | |
|---|---|---|---|
| 5,352,000 A * | 10/1994 | Issagholian-Havai | F16L 23/14 285/405 |
| 5,423,576 A * | 6/1995 | Hunter | F16L 23/14 285/288.1 |
| 5,653,474 A | 8/1997 | Ninacs et al. | |
| 5,673,947 A * | 10/1997 | De Waal | F16L 23/14 285/364 |
| 5,804,306 A | 9/1998 | Sorenson et al. | |
| 6,109,665 A * | 8/2000 | Meinig | F16L 23/12 285/365 |
| 6,497,105 B1 | 12/2002 | Stastny | |
| 7,004,512 B2 * | 2/2006 | Antonelli | F16L 23/06 285/364 |
| 7,073,826 B2 * | 7/2006 | Meinig | F16L 23/04 285/364 |
| 7,886,540 B2 | 2/2011 | Webb | |
| 8,316,541 B2 | 11/2012 | Patel et al. | |
| 8,393,648 B2 | 3/2013 | Marengo | |
| 8,678,450 B2 * | 3/2014 | Seraphinoff | F16L 23/026 285/364 |
| 8,740,135 B2 | 6/2014 | Light et al. | |
| 8,844,643 B2 | 9/2014 | Mickelsen et al. | |
| 2004/0250596 A1 * | 12/2004 | Hermanson | B21C 37/155 72/370.26 |
| 2005/0224125 A1 * | 10/2005 | Kajino | F16L 9/003 138/119 |
| 2012/0074694 A1 * | 3/2012 | Butte | F16L 23/04 285/336 |

\* cited by examiner

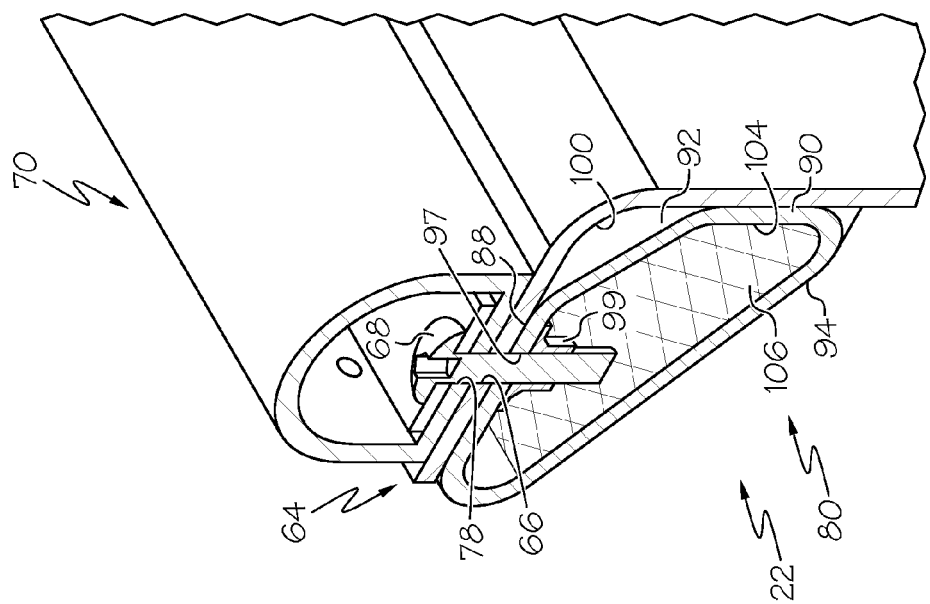
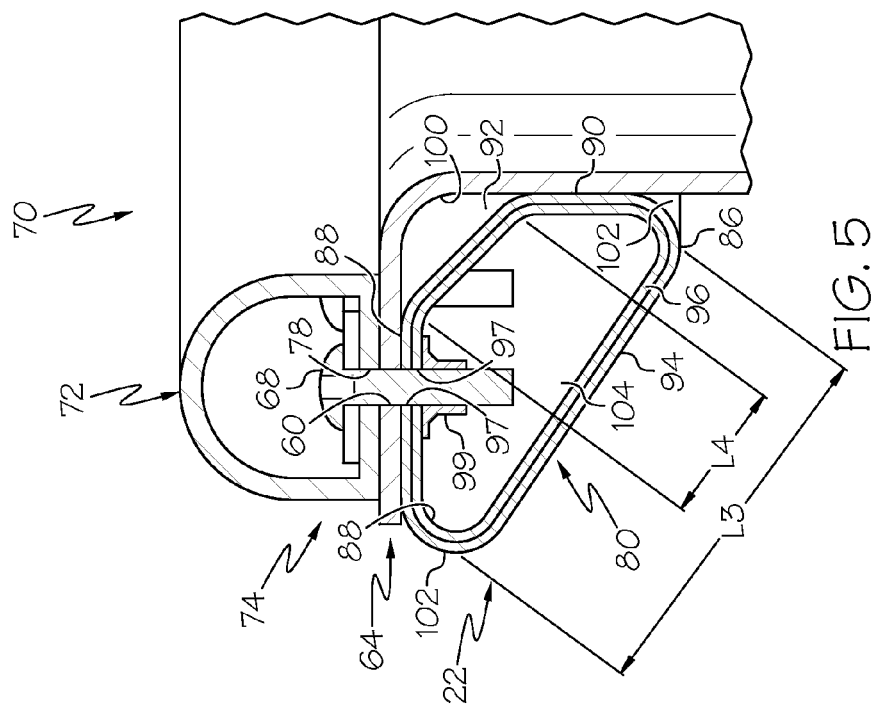

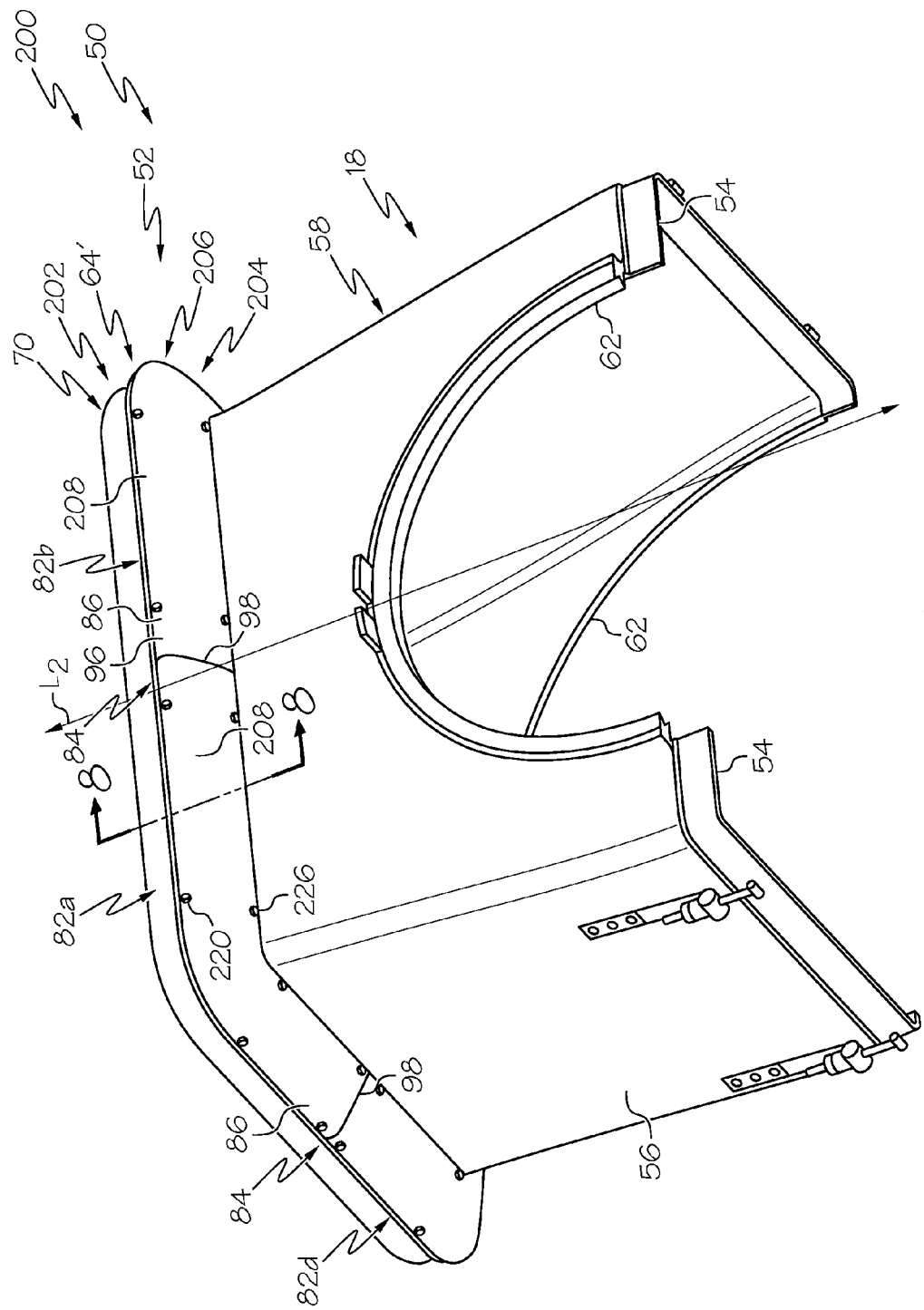

DUCT SYSTEMS INCLUDING SHIELD AND FLANGE SUPPORT

TECHNICAL FIELD

The present disclosure generally relates to fire protection and support, and more particularly relates to systems for a shield and flange support for a duct.

BACKGROUND

Many vehicles are subject to regulatory standards with regard to protection for the safety of passengers of the vehicle. For example, certain parts of the vehicle may be subject to regulatory standards for fire containment, such that a fire is unable to penetrate other areas of the vehicle. These certain parts of a vehicle may also need reinforcement in the case of an event, to aid in the containment.

Accordingly, it is desirable to provide improved systems for a shield and flange support. Furthermore, other desirable features and characteristics of the present invention will become apparent from the subsequent detailed description and the appended claims, taken in conjunction with the accompanying drawings and the foregoing technical field and background.

SUMMARY

According to various embodiments, a shield and flange support for a duct is provided. The shield and flange support includes a first side and a second side coupled to the first side to extend toward the duct. The first side and the second side cooperate to define a cavity, and the cavity includes at least one of a first insulating fluid and a first insulating solid.

A shield and flange support for a duct is provided, according to various embodiments. The shield and flange support comprises a body having a plurality of sides that cooperate to define a cavity. A first one of the plurality of sides is coupled to a flange and a second one of the plurality of sides is coupled to the duct. The body is coupled to the flange and the duct such that the body extends along a longitudinal axis substantially transverse to a longitudinal axis of the duct.

Also provided according to various embodiments is a duct system. The duct system includes a duct including a flange, and a shield and flange support for the duct. The shield and flange support comprises a first side coupled to a flange, and a second side coupled to the first side. The shield and flange support also comprises a third side coupled to the second side and to the duct and a fourth side coupled to the first side and the third side to define a cavity. At least one of a first insulating fluid and a first insulating solid is received in the cavity. The fourth side is spaced apart from the flange and the duct to define a gap for receipt of at least one of a second insulating fluid and a second insulating solid.

DESCRIPTION OF THE DRAWINGS

The exemplary embodiments will hereinafter be described in conjunction with the following drawing figures, wherein like numerals denote like elements, and wherein:

FIG. 5 is a detail view of a portion of the plenum of FIG. 3, as indicated in FIG. 3;

FIG. 6 is a cross-sectional view of the plenum of FIG. 2, taken along line 6-6 of FIG. 2;

FIG. 7 is a perspective view illustrating a plenum of the duct system of FIG. 1, which includes a shield and flange support in accordance with various embodiments;

FIG. 13 is a cross-sectional view of the duct system of FIG. 12, taken along line 13-13 of FIG. 12;

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any number of duct systems, and that the duct system described herein is merely one exemplary embodiment of the present disclosure. It should be noted that many alternative or additional functional relationships or physical connections may be present in an embodiment of the present disclosure.

Figure 1:
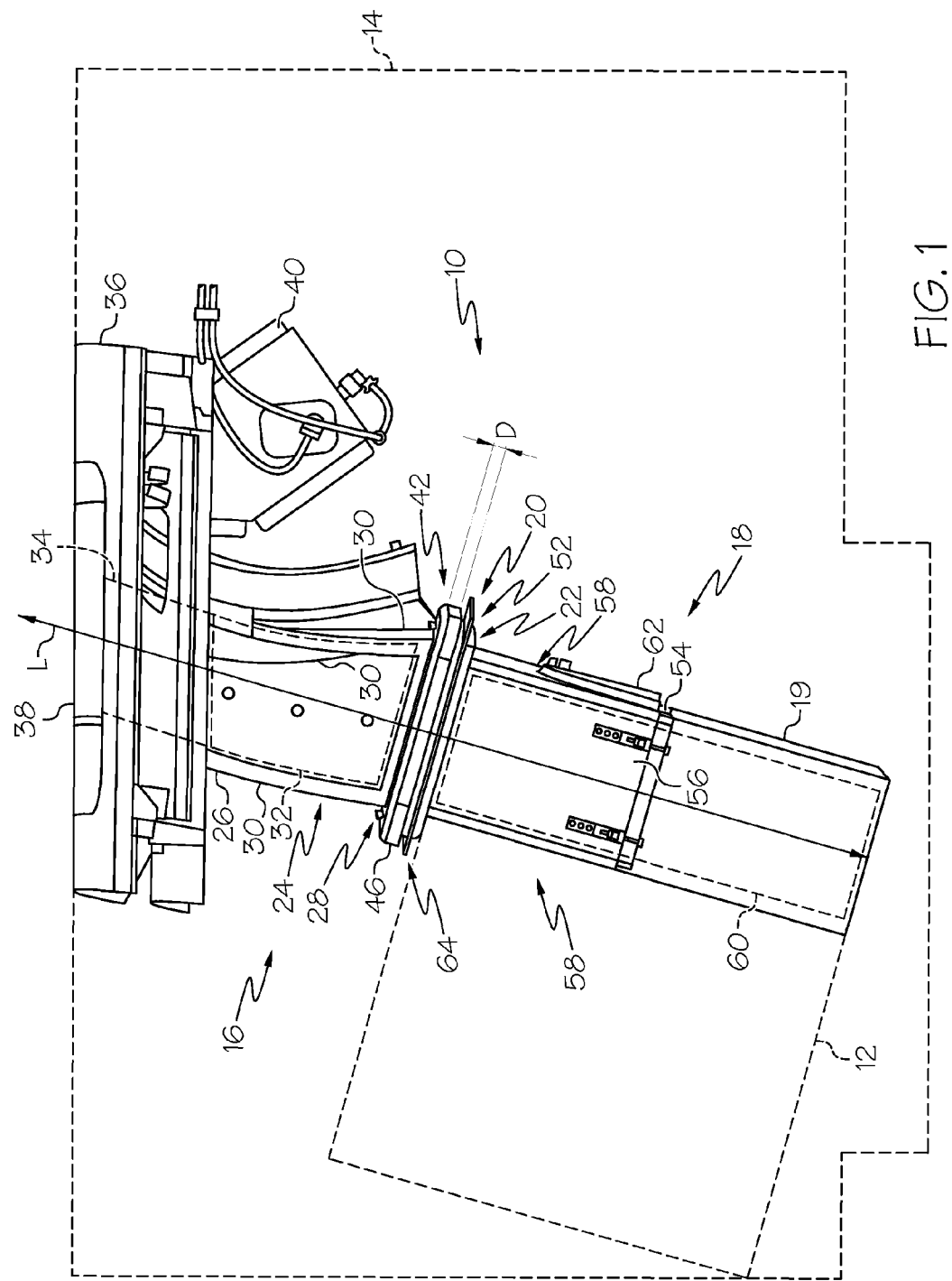
FIG. 1 is a schematic perspective illustration of a duct system that includes a shield and flange support in accordance with various embodiments.

With reference to FIG. 1, a duct system 10 is shown. The duct system 10 can be in communication with or employed with an auxiliary power unit (APU) 12, which can provide auxiliary power to a vehicle 14. In one example, the vehicle 14 is an aircraft, but the vehicle 14 can be any suitable vehicle, such as a marine vessel, bus, spacecraft, etc. Further, it should be noted that the use of the duct system 10 with the APU 12 and vehicle 14 is merely exemplary, as the duct system 10 can be employed with any suitable fluid ducting system. The duct system 10 includes a first duct or inlet duct 16, a second duct or plenum 18, a third duct or lower plenum 19 and a joint 20 between the inlet duct 16 and the plenum 18. As will be discussed in greater detail herein, one or more of the inlet duct 16, plenum 18 and the joint 20 includes a shield and flange support 22. Although the figures shown herein depict an example with certain arrangements of elements, additional intervening elements, devices, features, or components may be present in an actual embodiment. It should also be understood that FIG. 1 is merely illustrative and may not be drawn to scale.

The inlet duct 16 includes a body 24, which defines a first end 26 and a second end 28. The body 24 can be composed of any suitable material, such as a metal or polymer. In one example, the body 24 is composed of a composite polymeric material. The body 24 includes a plurality of sides 30 between the first end 26 and the second end 28, which cooperate to define a duct or passage 32 through the body 24 to enable fluid to flow through the inlet duct 16. In one example, the plurality of sides 30 are arranged to define a rectangular duct or passage 32, however, the plurality of sides 30 can be arranged to form any desired polygonal shape. Further, the body 24 need not include a plurality of sides 30, but can also be annular, circular or cylindrical, with a single side. Thus, the inlet duct 16 illustrated herein is merely exemplary.

The first end 26 of the body 24 is coupled to an inlet 34. As the inlet 34 is generally known to those skilled in the art, the inlet 34 will not be discussed in great detail herein. Briefly, however, the inlet 34 can be defined through a skin structure 36 of the vehicle 14, such that fluid surrounding the vehicle 14 can be drawn in through the inlet 34. In various embodiments, a door 38 can cover the inlet 34. The door 38 is moveable between an opened and closed position (and positions therebetween) by an actuator 40 to open and close the inlet 34. With the door 38 in the opened position, fluid surrounding the vehicle 14 flows through the inlet 34, into the passage 32 and to the plenum 18.

The second end 28 of the body 24 is coupled to the joint 20. In one example, the second end 28 includes an outwardly extending flange 42. The flange 42 can be integrally formed from a terminal portion of one or more of the plurality of sides 30 of the body 24. In this example, the flange 42 extends outwardly from the second end 28 of the body 24 at about a 90 degree angle, however, the flange 42 can extend outwardly from the second end 28 at any suitable angle. The flange 42 couples the second end 28 of the body 24 to the plenum 18 at the joint 20, thereby enabling fluid to flow from the inlet 34, through the passage 32 and into the plenum 18.

In one example, the flange 42 includes an overhang 46. The overhang 46 extends substantially downward from the flange 42, in a direction toward the plenum 18. Stated another way, the overhang 46 is substantially parallel to a longitudinal axis L defined through the duct system 10. In one example, the overhang 46 extends downward for a distance D to partially enclose a portion of the joint 20. It should be noted that the overhang 46 can extend downwardly for any desired distance, and thus, the distance D is merely exemplary. The overhang 46 can act as a drip shield, which can conduct fluid, such as water from condensation, down and away from the duct system 10.

The plenum 18 is coupled at the joint 20, and the lower plenum 19 is coupled to the plenum 18. The plenum 18 and the lower plenum 19 receive the fluid from the inlet duct 16. As the lower plenum 19 can be generally known to those skilled in the art, the lower plenum 19 will not be discussed in great detail herein. Briefly, however, the plenum 18 and the lower plenum 19 can cooperate to extend about 360 degrees about an intake of the APU 12. It should be noted that the lower plenum 19 can have any desired shape to cooperate with the APU 12, and further, the lower plenum 19 need not be separate from the plenum 18, but can be integrally formed.

Figure 2:
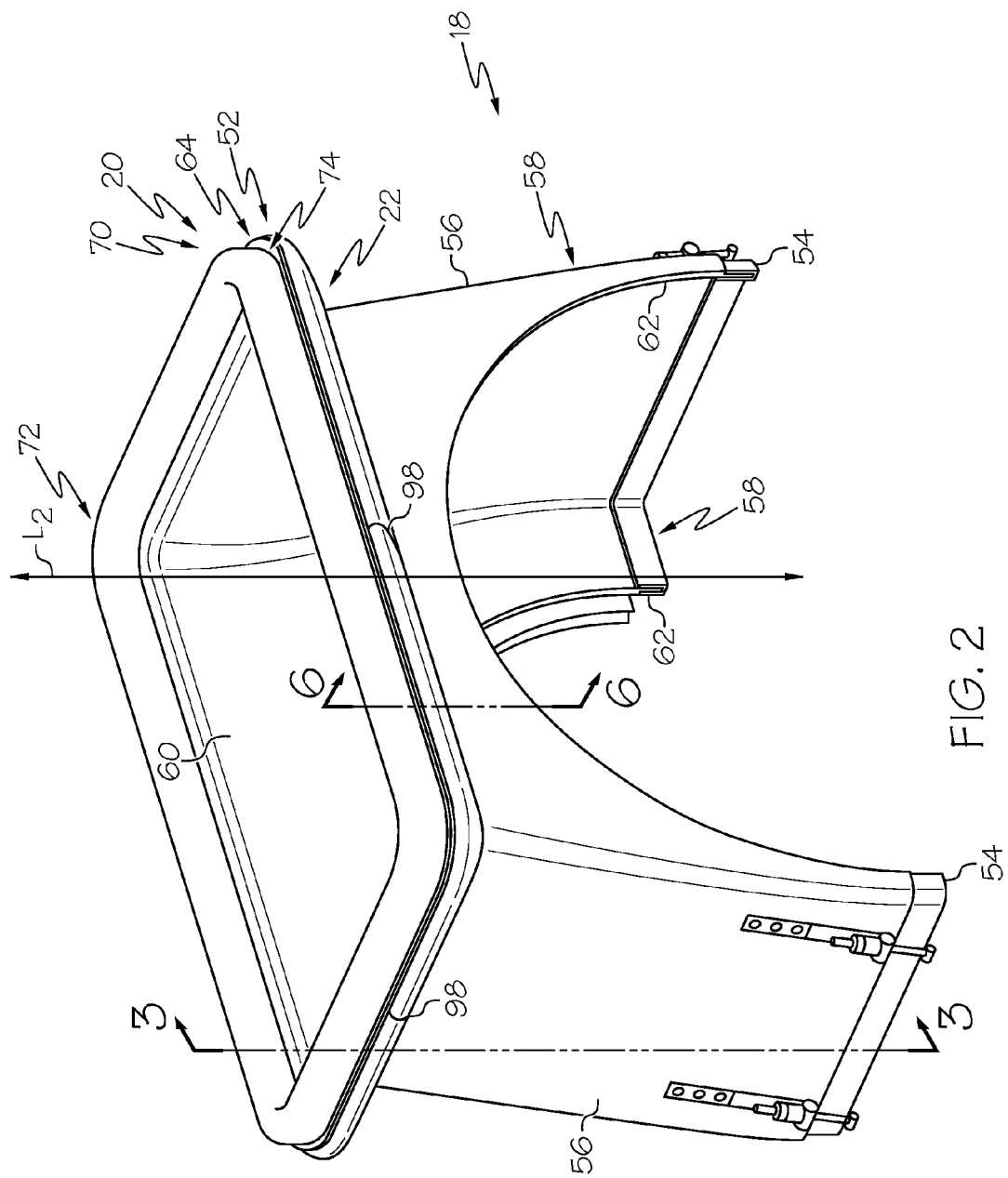
FIG. 2 is a perspective view illustrating a plenum of the duct system of FIG. 1, which includes the shield and flange support in accordance with various embodiments.

The plenum 18 has a body 50, which defines a first end 52 and a second end 54. The body 50 can be composed of any suitable material, such as a metal or polymer. In one example, the body 50 is composed of a composite polymeric material. The body 50 includes a plurality of first sides 56 and a plurality of second sides 58 between the first end 52 and the second end 54. With reference to FIG. 2, the plurality of first sides 56 and the plurality of second sides 58 cooperate to define a chamber 60. In one example, the plurality of first sides 56 have a slight angle or curvature from the first end 52 to the second end 54 such that the body 50 has a greater width at the second end 54 than the first end 52, when measured in a direction substantially perpendicular to a longitudinal axis L2 of the plenum 18. Each of the plurality of second sides 58 defines an aperture 62. The aperture 62 is substantially semi-circular. It should be noted that while the plenum 18 is described and illustrated herein as including both the plurality of first sides 56 and the plurality of second sides 58, the body 50 of the plenum 18 can have any number of sides and can have any suitable shape. Thus, the plenum 18 illustrated herein is merely exemplary.

With reference to FIGS. 1 and 2, the second end 54 of the body 50 has an open perimeter due to the plurality of second sides 58. The second end 54 of the body can be coupled to a mating structure to complete the plenum 18 and/or can be coupled to structure associated with the APU 12 as is generally known. The first end 52 of the body 50 includes an outwardly extending flange 64. The flange 64 can be integrally formed from a terminal portion of one or more of the plurality of first sides 56 and the plurality of second sides 58 of the body 50. In this example, the flange 64 extends outwardly from the first end 52 of the body 50 at about a 90 degree angle, however, the flange 64 can extend outwardly from the first end 52 at any suitable angle. The flange 64 couples the first end 52 of the body 50 to the inlet duct 16 at the joint 20, thereby enabling fluid to flow into the plenum 18.

In one example, the flange 64 includes one or more throughbores 66. The throughbores 66 are sized and shaped to receive a suitable fastener to couple the flange 64 at the joint 20. In one example, each of the throughbores 66 receives a mechanical fastener 68, such as a bolt, however, it should be understood that the flange 64 can be coupled at the joint 20 via any suitable technique, such as riveting, adhesives, etc. Thus, the use of mechanical fasteners 68 is merely exemplary. In this example, the mechanical fasteners 68 also couple the shield and flange support 22 to the flange 64, as will be discussed in greater detail herein.

With reference to FIG. 2, the joint 20 between the inlet duct 16 and the plenum 18 includes a seal 70. The seal 70 is shaped and sized to cooperate with the flange 42 of the second end 28 of the inlet duct 16 (FIG. 1) and the flange 64 of the first end 52 of the plenum 18. The seal 70 comprises any suitable seal for joining the inlet duct 16 and the plenum 18, and can be composed of a suitable material, such as an elastomeric material, for example, an elastomeric polymer. The seal 70 includes a first face 72 and a second face 74. The first face 72 cooperates with the flange 42 of the inlet duct 16 (FIG. 1). In one example, the first face 72 is substantially uninterrupted, but the first face 72 can include a plurality of bores, if desired. The plurality of bores, if employed, be each coaxially aligned with a respective plurality of the throughbores associated with the flange 42 to receive a mechanical fastener to couple the inlet duct 16 to the seal 70 at the joint 20. Generally, one of the inlet duct 16 or the plenum 18 is fixedly coupled to the seal 70 at the joint 20 to enable relative movement between the inlet duct 16 and the plenum 18. It should be noted, however, that both the inlet duct 16 and the plenum 18 can be fixedly coupled to the seal 70 at the joint 20, if desired.

Figure 3:
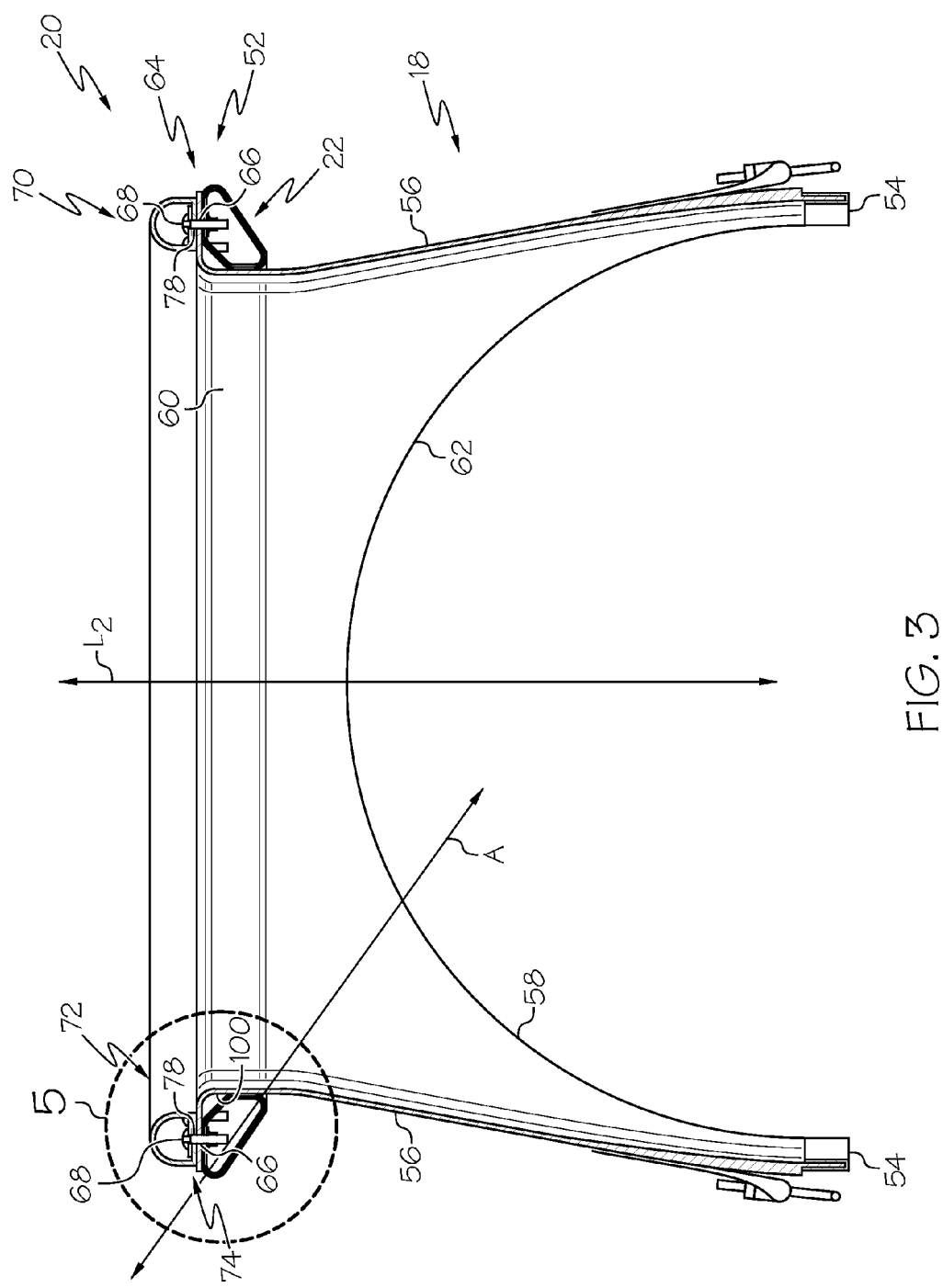
FIG. 3 is a cross-sectional view of the plenum of FIG. 2, taken along line 3-3 of FIG. 2.

The second face 74 cooperates with the flange 64 of the plenum 18, and with reference to FIG. 3, includes a plurality of bores 78. The plurality of bores 78 are each coaxially aligned with a respective one of the throughbores 66 of the flange 64 to receive the mechanical fastener 68 to couple the plenum 18 to the seal 70 at the joint 20. It should be noted that the number of the plurality of bores 78 is merely exemplary, as any suitable number of the plurality of bores 78 can be employed to couple the plenum 18 to the seal 70. In addition, while mechanical fasteners 68 are illustrated herein for coupling the plenum 18 to the seal 70, any suitable technique can be employed to couple the plenum 18 to the seal 70, such as adhesives, rivets, etc. Furthermore, the use of the seal 70 is merely exemplary as the inlet duct 16 can be coupled directly to the plenum 18, if desired.

In one embodiment, the shield and flange support 22 is coupled to the flange 64 of the first end 52 of the plenum 18 to provide additional rigidity to the flange 64 and to also shield the flange 64, and thus, the seal 70 and inlet duct 16 during an event. The shield and flange support 22 includes a body 80, which is sized to extend about the first end 52 of the plenum 18 adjacent to the flange 64. The body 80 can be formed of any suitable material, such as a metal or polymer. In one example, the body 80 is composed of a composite polymer. As a further example, the body 80 is formed of a composite polymer, using a salt mandrel forming method. The body 80 generally extends along a longitudinal axis A, which is substantially transverse to the longitudinal axis L2 of the plenum 18.

Figure 4:
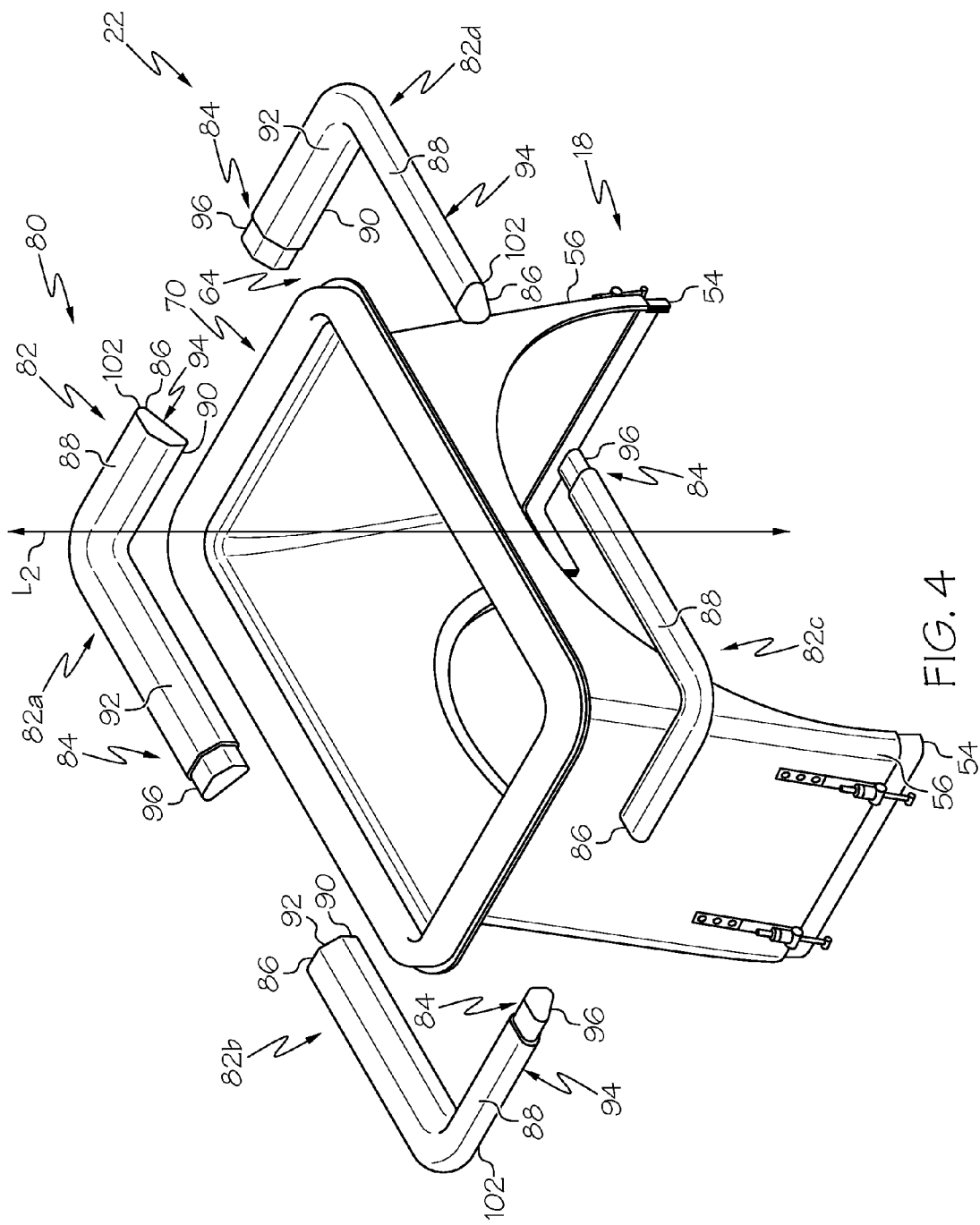
FIG. 4 is an exploded view of the plenum of FIG. 2.

In one example, with reference to FIG. 4, the body 80 includes a plurality of sections 82, which are coupled together to extend about the first end 52 of the plenum 18. It should be noted that while the body 80 is illustrated herein as forming a closed perimeter about the first end 52, the body 80 can have an open perimeter, if desired. In this example, the body includes four sections 82a-82d, which are generally asymmetric about the longitudinal axis L2 of the plenum 18. In addition, it should be noted that while the body 80 is described and illustrated herein as including four sections 82a-82d, the body 80 can include any number of sections or can be formed as a single piece. By forming the body 80 out of the sections 82a-82d, the body 80 is easier to assemble about the first end 52. In this example, the sections 82a-82d are substantially L-shaped to form a rectangle about the perimeter of the plenum 18 to support the flange 64, which is also substantially a rectangle disposed about the plenum 18. It should be noted that the sections 82a-82d can have any desired shape that corresponds with the shape of the flange 64 and/or plenum 18. The sections 82a-82d each include a first end 84, a second end 86, a first side 88, a second side 90, a third side 92 and a fourth side 94.

The first end 84 of each of the sections 82a-82d includes a projection 96. The projection 96 couples the first end 84 of the respective section 82a-82d to the second end 86 of the respective section 82a-82d. The projection 96 extends outwardly from the first end 84 of the section 82a-82d, and is generally the same shape as the remainder of the section 82a-82d. In one example, with reference to FIG. 5, the projection 96 has a smaller cross-section than a cross-section of the remainder of the section 82a-82d so that the projection 96 is receivable within the second end 86 of an adjacent one of the sections 82a-82d.

Thus, with additional reference to FIG. 2, the projections 96 enable the sections 82a-82d to be coupled together with an area of overlap 98, thereby providing rigidity to the body 80 of the shield and flange support 22. Stated another way, the projections 96 enable the sections 82a-82d to be assembled in an interlocking manner, in which the projection 96 of a respective section 82a-82b overlaps with a respective second end 86 of an adjacent section 82a-82d. As will be discussed further herein, the overlap 98 also provides reinforcement when coupling the sections 82a-82d to the flange 64.

With reference to FIG. 4, the second end 86 of the sections 82a-82d receives the projection 96 of the first end 84 of the respective adjacent section 82a-82d. The second end 86 can have the same size cross-section as the remainder of the section 82a-82d to receive the projection 96. The first side 88 of the sections 82a-82d contacts the flange 64 when the body 80 is coupled to the flange 64. Thus, the first side 88 can be substantially planar. With reference to FIG. 5, the first side 88 includes one or more bores 97. The bores 97 can be coaxially aligned with the throughbores 66 of the flange 64 and bores 78 of the seal 70 such that a respective one of the mechanical fasteners 68 can be received through the bores 97 to couple the flange 64 and the shield and flange support 22 to the seal 70. In one example, the first side 88 includes one or more nuts 99 each coupled about the periphery of a respective one of the bores 97. Each of the nuts 99 threadably engages a respective one of the mechanical fasteners 68 to couple the shield and flange support 22 to the flange 64. It should be noted that the use of the bores 97 and nuts 99 is merely exemplary, as any suitable technique can be employed to couple the shield and flange support 22 to the flange 64, such as rivets, adhesive bonding, etc.

The second side 90 can be offset relative to the first side 88 by about 90 degrees. The second side 90 contacts one of the plurality of first sides 56 and one of the plurality of second sides 58 when the body 80 is coupled to the plenum 18. In addition, although not illustrated herein, the second side 90 can also include one or more bores to facilitate coupling the shield and flange support 22 to the plenum 18.

The third side 92 interconnects the first side 88 and the second side 90. The third side 92 extends from the first side 88 at about a negative 45 degree to about a negative 25 degree angle, and extends from the second side 90 at about a 115 degree to about a 135 degree angle. It should be noted that these angles are merely exemplary, as the angle of the third side 92 to the first side 88 and the second side 90 can vary depending upon the shape of the flange 64. Generally, the third side 92 is coupled to the first side 88 and the second side 90 with rounded corners. Thus, the third side 92 extends transverse to the longitudinal axis L2 of the plenum 18, while the first side 88 is substantially perpendicular to the longitudinal axis L2 and the second side 90 is substantially parallel to the longitudinal axis L2.

With reference to FIG. 5, the angled position of the third side 92 defines an air gap 100 between the body 80 and the flange 64. The air gap 100 provides an insulating barrier between the body 80 and the flange 64, thereby further protecting the flange 64. It should be noted that the size and shape of the air gap 100 is merely exemplary as the air gap 100 can have any desired shape, and thus, the position of the third side 92 relative to the first side 88 and second side 90 can be adjusted as desired to increase or decrease the size or volume of the air gap 100.

The fourth side 94 can be substantially opposite the third side 92. The fourth side 94 interconnects the first side 88 and the second side 90. The fourth side 94 is coupled to the first side 88 and the second side 90 at a rounded corner 102, and the fourth side 94 extends transverse to the longitudinal axis L2 of the plenum 18. Generally, the fourth side 94 has a greater length L3 than a length L4 of the third side 92. It should be noted that the arrangement of the first side 88, the second side 90, the third side 92 and the fourth side 94 is merely exemplary, as the body 80 can have any desired cross-section, such as triangular, square, rectangular, etc., and thus, the polygonal cross-section illustrated herein in FIG. 5 is merely exemplary.

With continued reference to FIG. 5, the first side 88, the second side 90, the third side 92 and the fourth side 94 cooperate to enclose a cavity 104. Stated another way, the body 80 of the shield and flange support 22 is hollow, and defines the cavity 104. The cavity 104 can be filled with a suitable insulating fluid, such as air. It should be noted that the cavity 104 can also be filled with a solid fire retardant material and can be filled with a suitable combination of solid fire retardant material and an insulating fluid. For example, the cavity 104 can be filled with ceramic, vermiculite, basalt, mica, graphite, and/or any suitable fire retardant material. Further, the cavity 104 can include combinations of solid fire retardant material, if desired.

In addition, with reference to FIG. 6, one or more of the first side 88, the second side 90, the third side 92 and the fourth side 94 can include a coating 106. In one example, the coating 106 is a fire retardant coating, such as an intumescent paint, an ablative coating, etc. The coating 106 can be applied on an interior surface of one or more of the first side 88, the second side 90, the third side 92 and the fourth side 94 such that the coating 106 is within the cavity 104. For the ease of illustration, the coating 106 is illustrated with cross-hatching in FIG. 6 on an interior surface of the fourth side 94. It should be understood that the application of the coating to the fourth side 94 is merely exemplary, and that the coating 106 can be applied to any suitable surface, internal or external, of the shield and flange support 22.

With reference now to FIG. 7, a duct system 200 is shown. As the duct system 200 can be similar to the duct system 10 discussed with regard to FIGS. 1-6, only the differences between the duct system 10 and the duct system 200 will be discussed in detail herein, with the same reference numerals used to denote the same or substantially similar components.

With reference to FIG. 7, the duct system 200 can be in communication with or employed with the APU 12, which can provide auxiliary power to the vehicle 14 (FIG. 1). The duct system 200 includes the inlet duct 16 (FIG. 1), the plenum 18 and a joint 202 between the inlet duct 16 and the plenum 18. As will be discussed in greater detail herein, one or more of the inlet duct 16, the plenum 18 and the joint 202 includes a shield and flange support 204. Although the figures shown herein depict an example with certain arrangements of elements, additional intervening elements, devices, features, or components may be present in an actual embodiment. It should also be understood that FIG. 7 is merely illustrative and may not be drawn to scale.

Figure 8:
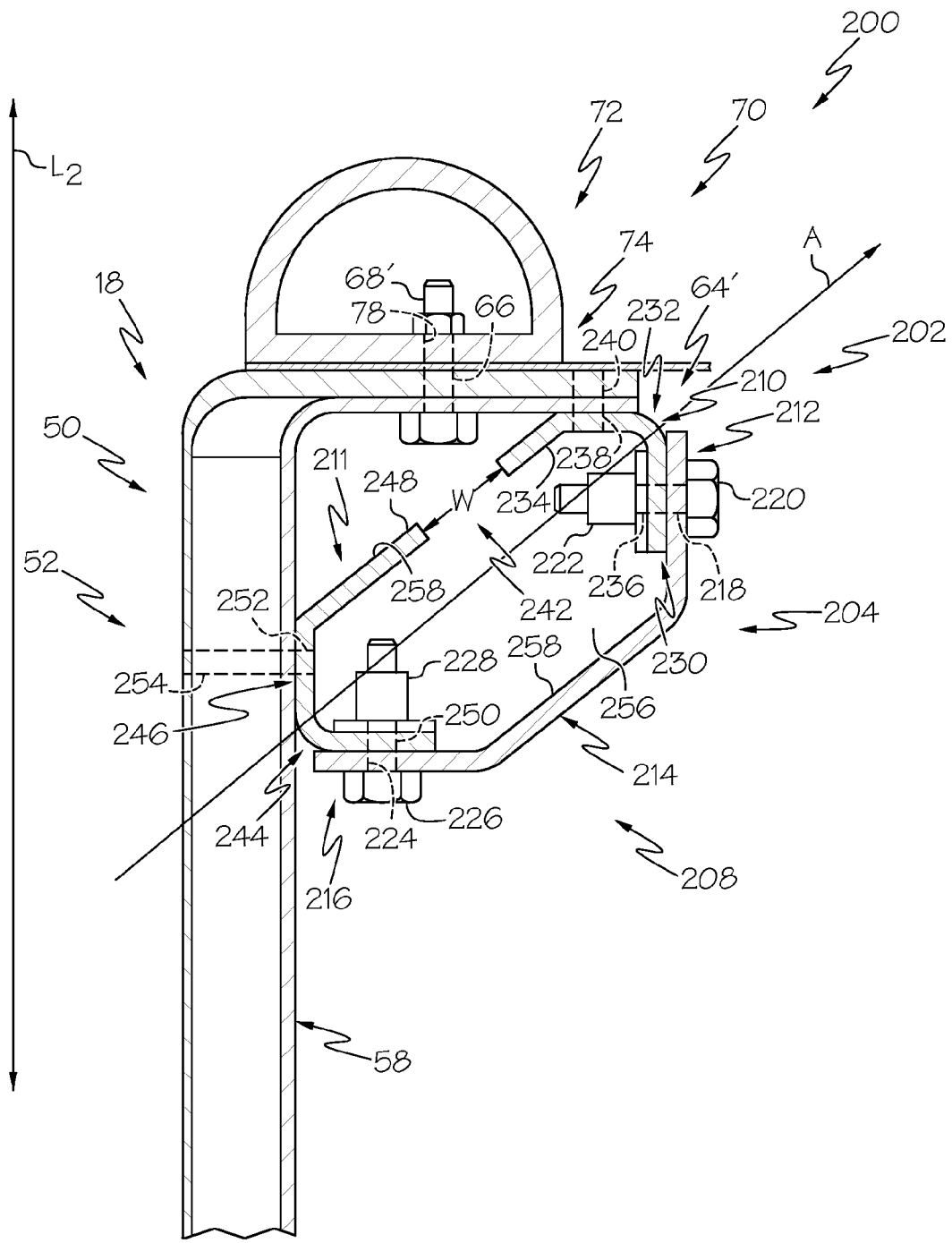
FIG. 8 is a cross-sectional view of the plenum of FIG. 7, taken along line 8-8 of FIG. 7.

The plenum 18 is coupled to the seal 70 at the joint 20. The first end 52 of the body 50 includes an outwardly extending flange 64'. With reference to FIG. 8, the flange 64' includes one or more throughbores 66. The throughbores 66 are sized and shaped to receive a suitable fastener to couple the flange 64' at the joint 202. In one example, each of the throughbores 66 receive a mechanical fastener 68', such as a bolt, however, it should be understood that the flange 64' can be coupled at the joint 202 via any suitable technique, such as riveting, adhesives, etc. Thus, the use of mechanical fasteners 68' is merely exemplary.

With reference to FIG. 7, the joint 202 between the inlet duct 16 and the plenum 18 includes the seal 70. The seal 70 is shaped and sized to cooperate with the flange 42 of the inlet duct 16 (FIG. 1) and the flange 64' of the plenum 18. The seal 70 comprises any suitable seal for joining the inlet duct 16 and the plenum 18, and can be composed of a suitable material, such as an elastomeric material, for example, an elastomeric polymer. With reference to FIG. 8, the seal 70 includes the first face 72 and the second face 74. The second face 74 cooperates with the flange 64' of the plenum 18 and includes the plurality of bores 78. The plurality of bores 78 are each coaxially aligned with a respective one of the throughbores 66 of the flange 64 to receive the mechanical fastener 68' to couple the plenum 18 to the seal 70 at the joint 20.

In one embodiment, the shield and flange support 204 is coupled to the flange 64' of the plenum 18 to provide additional rigidity to the flange 64' and to also shield the flange 64', and thus, the seal 70 and inlet duct 16 (FIG. 1) during an event. The shield and flange support 204 includes a body 206, which is sized to extend about the first end 52 of the plenum 18 adjacent to the flange 64'. The body 206 can be formed of any suitable material, such as a metal or polymer. In one example, the body 206 is composed of a composite polymer. The body 206 generally extends along the longitudinal axis A, which is substantially transverse to the longitudinal axis L2 of the plenum 18.

In one example, the body 206 includes the plurality of sections 82, which are coupled together to extend about the first end 52 of the plenum 18. It should be noted that while the body 206 is illustrated herein as forming a closed perimeter about the first end 52, the body 206 can have an open perimeter, if desired. In this example, the body includes four sections 82a-82d, which are generally asymmetric about the longitudinal axis L2 of the plenum 18. In addition, it should be noted that while the body 206 is described and illustrated herein as including four sections 82a-82d, the body 206 can include any number of sections or can be formed as a single piece. By forming the body 206 out of the sections 82a-82d, the body 206 is easier to assemble about the first end 52. In this example, the sections 82a-82d are substantially L-shaped to form a rectangle about the perimeter of the plenum 18 to support the flange 64', which is also substantially a rectangle disposed about the plenum 18. It should be noted that the sections 82a-82d can have any desired shape that corresponds with the shape of the flange 64' and/or plenum 18. The sections 82a-82d each includes the first end 84, the second end 86, a first side portion 208, a second side portion 210 (FIG. 8) and a third side portion 211 (FIG. 8). Thus, in this example, the shield and flange support 204 can comprises a multiple-piece or multiple-part body 206, which can provide access to the mechanical fasteners 68'. It should be noted that the second side portion 210 can be integrally formed with the third side portion 211, if desired, and a plurality of access holes can be defined along the integrally formed part. Thus, the second side portion 210 and third side portion 211 illustrated and described herein is merely exemplary.

The first end 84 of each of the sections 82a-82d includes the projection 96. The projection 96 couples the first end 84 of the respective section 82a-82d to the second end 86 of a respective section 82a-82d. The projections 96 enable the sections 82a-82d to be coupled together with an area of overlap 98, thereby providing rigidity to the body 80 of the shield and flange support 204. The second end 86 of the sections 82a-82d receives the projection 96 of the first end 84 of the respective adjacent section 82a-82d.

With reference to FIG. 8, the first side portion 208 of the sections 82a-82d defines an exterior surface of the shield and flange support 204. The first side portion 208 includes a first segment 212, a second segment 214 and a third segment 216. The first segment 212, second segment 214 and third segment 216 cooperate to define the exterior surface of the shield and flange support 204 and to enclose the second side portion 210. It should be noted that the shape of the first segment 212, second segment 214 and third segment 216 illustrated and described herein is merely exemplary, as the first segment 212, second segment 214 and third segment 216 can have any desired shape to cooperate with the second side portion 210 to define the body 206.

In one example, the first segment 212 includes a bore 218, which receives a suitable mechanical fastener 220 to removably couple the first side portion 208 to the second side portion 210. In this example, the mechanical fastener 220 is a bolt, which threads into a nut 222 coupled to the second side portion 210, but it should be understood that the use of the nut 222 and mechanical fastener 220 is merely exemplary. In this regard, any suitable technique can be used to couple the first side portion 208 to the second side portion 210.

The second segment 214 extends between the first segment 212 and the third segment 216, and is substantially planar. Generally, the second segment 214 extends between the first segment 212 and the third segment 216 so as to be transverse to the longitudinal axis L2 of the plenum 18. The third segment 216 includes a bore 224. The bore 224 receives a suitable mechanical fastener 226 to removably couple the first side portion 208 to the third side portion 211. In this example, the mechanical fastener 226 is a bolt, which threads into a nut 228 coupled to the second side portion 210, but it should be understood that the use of the nut 228 and mechanical fastener 226 is merely exemplary. In this regard, any suitable technique can be used to couple the first side portion 208 to the second side portion 210. Further, the mechanical fastener 226 can be substantially similar to the mechanical fastener 220 and the nut 228 can be substantially similar to the nut 222, if desired, for ease of assembly.

The second side portion 210 is coupled to the first side portion 208 and the flange 64'. In one example, the second side portion 210 includes a first segment 230, a second segment 232 and a third segment 234. It should be noted that the shape of the first segment 230, second segment 232 and third segment 234 illustrated and described herein is merely exemplary, as the first segment 230, second segment 232 and third segment 234 can have any desired shape to cooperate with the first side portion 208 to define the body 206. The first segment 230 defines a bore 236, which receives the mechanical fastener 220. The nut 222 is coupled to the first segment 230 about the bore 236 to removably couple the mechanical fastener 220 to the first segment 230.

The second segment 232 is coupled to the first segment 230 and the third segment 234. The second segment 232 can be substantially planar and includes one or more throughbores 238. The throughbores 238 each receive a suitable mechanical fastener to couple the second segment 232 to the flange 64'. Thus, in this embodiment, the flange 64' includes a plurality of second throughbores 240, which receives the suitable mechanical fastener to couple the shield and flange support 204 to the flange 64'. It should be noted that the plurality of second throughbores 240 are merely exemplary, as the shield and flange support 204 can be coupled to the flange 64' via the plurality of throughbores 66, if desired. The third segment 234 extends outwardly from the second segment 232, and cooperates with a portion of the third side portion 211 to define an access gap 242. The access gap 242 permits an operator to access the mechanical fastener 68'. Thus, the access gap 242 enables the removal of the mechanical fasteners 68' from the joint 202, which can allow for the repair or replacement of the seal 70 without the full removal of the shield and flange support 204. It should be noted that while the access gap 242 is illustrated herein as comprising a slot, the access gap 242 can also comprise a cylindrical bore or any suitable shape to provide access to the mechanical fasteners 68'.

The third side portion 211 is coupled to the first side portion 208 and the first side 52 of the body 50 of the plenum 18. In one example, the third side portion 211 includes a first segment 244, a second segment 246 and a third segment 248. It should be noted that the shape of the first segment 244, second segment 246 and third segment 248 illustrated and described herein is merely exemplary, as the first segment 244, second segment 246 and third segment 248 can have any desired shape to cooperate with the first side portion 208 to define the body 206. The first segment 244 defines a bore 250, which receives the mechanical fastener 226. The nut 228 is coupled to the first segment 244 about the bore 250 to removably couple the mechanical fastener 226 to the first segment 244.

The second segment 246 is coupled to the first segment 244 and the third segment 248. The second segment 246 can be substantially planar and includes one or more throughbores 252. The throughbores 252 each receive a suitable mechanical fastener to couple the second segment 246 to the first end 52 of the plenum 18. Thus, in this embodiment, one or more of the plurality of first sides 56 and the plurality of second sides 58 includes a second throughbore 254, which receives the suitable mechanical fastener to couple the shield and flange support 204 to the plenum 18. The third segment 248 extends outwardly from the second segment 246, and cooperates with a portion of the second side portion 210 to define the access gap 242. It should be noted that the size of the access gap 242 is merely exemplary, as the width W of the access gap 242 can vary based on the size and type of mechanical fastener 68'. The access gap 242 also provides a space for an insulating fluid, such as air. Thus, the access gap 242 provides access to the mechanical fastener 68' and also serves to insulate the flange 64'.

With continued reference to FIG. 8, the first side portion 208, the second side portion 210 and the third side portion 211 cooperate to enclose a cavity 256. Stated another way, the body 206 of the shield and flange support 204 is hollow, and defines the cavity 256. The cavity 256 can be filled with a suitable insulating fluid, such as air. It should be noted that the cavity 256 can also be filled with an insulating solid, such as a solid fire retardant material and can be filled with a suitable combination of an insulating solid and an insulating fluid. For example, the cavity 256 can be filled with ceramic, vermiculite, basalt, mica, graphite, and/or any suitable fire retardant material. Further, the cavity 256 can include combinations of solid fire retardant material, if desired.

In addition, with reference to FIG. 8, one or more of first side portion 208, the second side portion 210 and the third side portion 211 can include a coating 258. In one example, the coating 258 is a fire retardant coating, such as an intumescent paint, an ablative coating, etc. The coating 258 can be applied on an interior surface of one or more of the second segment 214 of the first side portion 208 and a surface of the third segment 248 of the third side portion 211, which faces the first side portion 208. For the ease of illustration, the coating 258 is not illustrated herein, but it should be understood that the coating 258 can be applied to all or a portion of one or more of the surfaces of the first side portion 208, the second side portion 210 and the third side portion 211.

Figure 9:
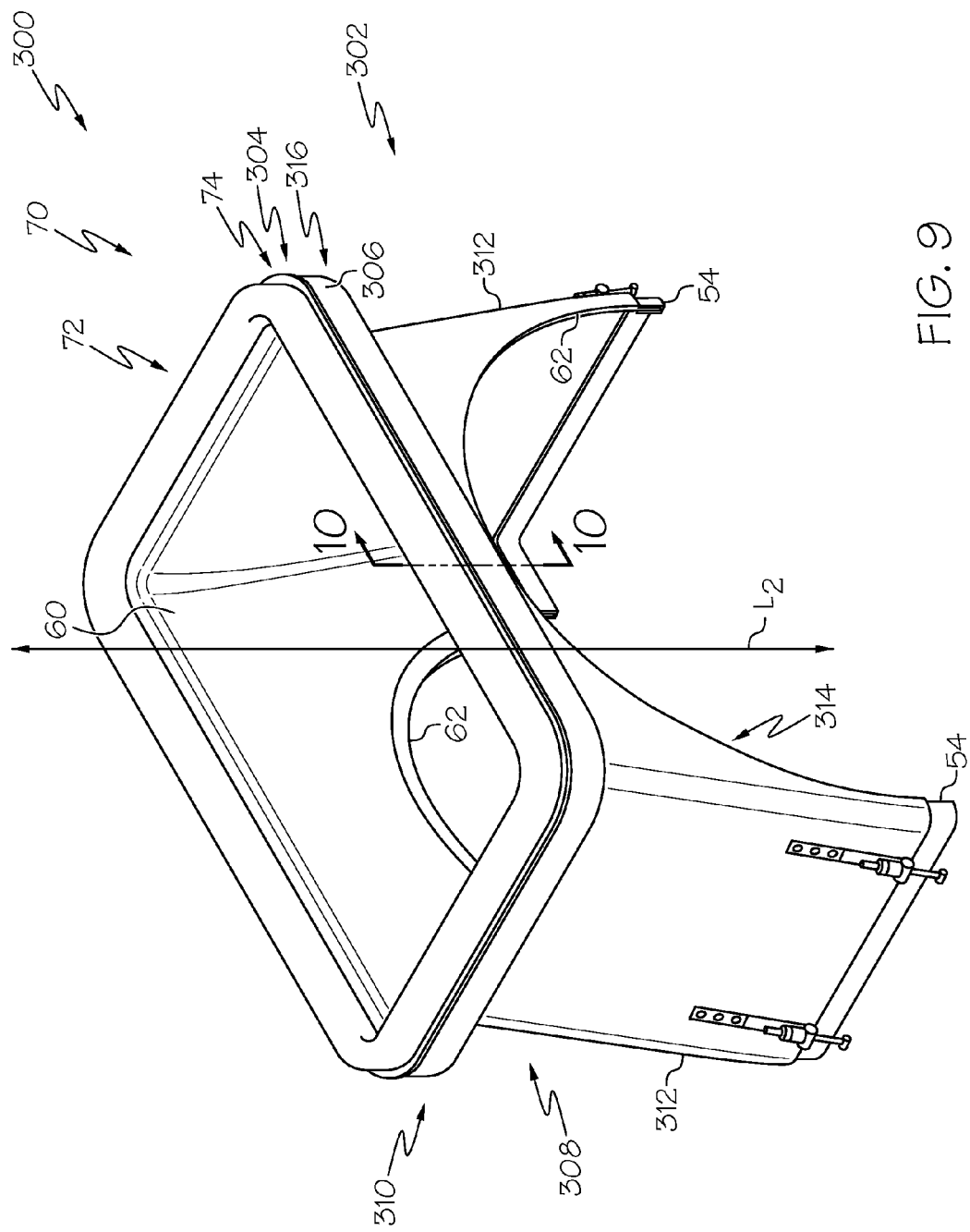
FIG. 9 is a perspective view illustrating a plenum of the duct system of FIG. 1, which includes a shield and flange support in accordance with various embodiments.

With reference now to FIG. 9, a duct system 300 is shown. As the duct system 300 can be similar to the duct system 10 discussed with regard to FIGS. 1-6, only the differences between the duct system 10 and the duct system 300 will be discussed in detail herein, with the same reference numerals used to denote the same or substantially similar components.

The duct system 300 can be in communication with or employed with the APU 12, which can provide auxiliary power to the vehicle 14 (FIG. 1). The duct system 300 includes the inlet duct 16 (FIG. 1), a second duct or plenum 302 and a joint 304 between the inlet duct 16 and the plenum 302. As will be discussed in greater detail herein, one or more of the inlet duct 16, plenum 302 and the joint 304 includes a shield and flange support 306. Although the figures shown herein depict an example with certain arrangements of elements, additional intervening elements, devices, features, or components may be present in an actual embodiment. It should also be understood that FIG. 9 is merely illustrative and may not be drawn to scale.

The plenum 302 is coupled at the joint 304. The plenum 302 receives the fluid from the inlet duct 16. The plenum 302 has a body 308, which defines a first end 310 and the second end 54. The body 308 can be composed of any suitable material, such as a metal or polymer. In one example, the body 308 is composed of a composite polymeric material. The body 308 includes a plurality of first sides 312 and a plurality of second sides 314 between the first end 310 and the second end 54. The plurality of first sides 312 and the plurality of second sides 314 cooperate to define the chamber 60. In one example, the plurality of first sides 312 have a slight angle or curvature from the first end 310 to the second end 54 such that the body 308 has a greater width at the second end 54 than the first end 310, when measured in a direction substantially perpendicular to a longitudinal axis L2 of the plenum 302. Each of the plurality of second sides 314 defines the aperture 62. The aperture 62 is substantially semi-circular. It should be noted that while the plenum 302 is described and illustrated herein as including both the plurality of first sides 312 and the plurality of second sides 314, the body 308 of the plenum 302 can have any number of sides and can have any suitable shape. Thus, the plenum 302 illustrated herein is merely exemplary.

The first end 310 of the body 308 includes a flange 316. The flange 316 can be integrally formed from a terminal portion of one or more of the plurality of first sides 312 and the plurality of second sides 314 of the body 308. Generally, the flange 316 extends about the perimeter of the first end 310 of the plenum 302. In this example, with reference to FIG. 10, the flange 316 includes a first portion 318 and the shield and flange support 306. The first portion 318 extends outwardly from the first end 310 of the body 308 at about a 90 degree angle, and is substantially planar. It should be noted, however, that the first portion 318 can extend outwardly from the first end 310 at any suitable angle. The flange 316 couples the first end 310 of the body 308 to the inlet duct 16 (FIG. 1) at the joint 304, thereby enabling fluid to flow into the plenum 302.

In one example, the flange 316 includes one or more throughbores 322. The throughbores 322 are sized and shaped to receive a suitable fastener to couple the flange 316 at the joint 304. In one example, each of the throughbores 322 receive a mechanical fastener, such as a bolt, however, it should be understood that the flange 316 can be coupled at the joint 304 via any suitable technique, such as riveting, adhesives, etc. Thus, the use of mechanical fasteners is merely exemplary.

The shield and flange support 306 is integrally formed with the first portion 318 of the flange 316, and extends downwardly, or towards the second end 54 of the plenum 302 at an angle towards the respective one of the plurality of first sides 312 and the plurality of second sides 314. Thus, the shield and flange support 306 is coupled to the first portion 318 and coupled to the respective one of the plurality of first sides 312 and the plurality of second sides 314. By coupling the first portion 318 to the respective one of the plurality of first sides 312 and the plurality of second sides 314 via the shield and flange support 306, the shield and flange support 306 imparts rigidity to the first portion 318 of the flange 316.

In one example, the shield and flange support 306 extends from the first portion 318 at about a negative 45 degree angle, however, the shield and flange support 306 can extend from the first portion 318 at any desired angle. The shield and flange support 306, while formed integral with the first portion 318, can be formed so as to be thinner or with a reduced thickness T1 as compared to a thickness T2 of the first portion 318. For example, the first portion 318 can be composed of about 6 plies of composite polymer, while the shield and flange support 306 can be composed of about 3 to about 4 plies of composite polymer. It should be noted, that the shield and flange support 306 can have the same thickness and number of plies of composite material of the first portion 318, if desired, and thus, the shield and flange support 306 illustrated herein is merely exemplary.

Figure 10:
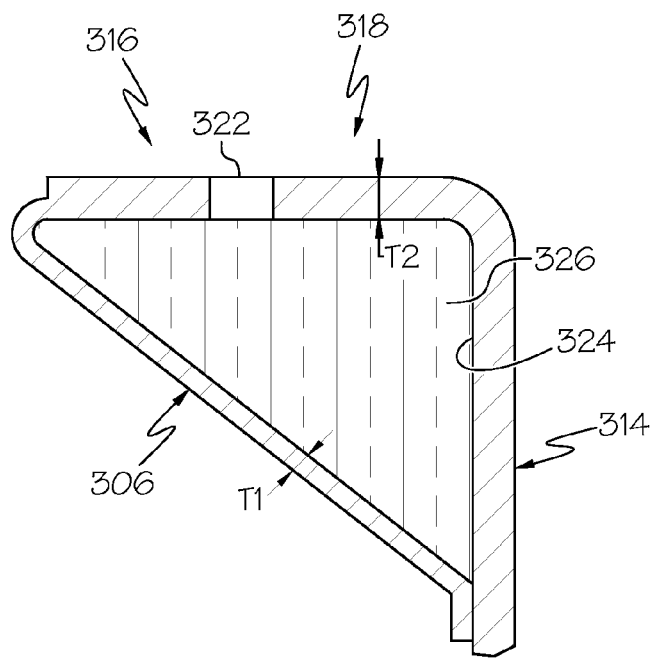
FIG. 10 is a cross-sectional view of the plenum of FIG. 9, taken along line 10-10 of FIG. 9.

The first portion 318 and the shield and flange support 306 are integrally formed and coupled to a respective one of the plurality of first sides 312 and the plurality of second sides 314 to define a cavity 324. The cavity 324 can be filled with a reinforcing material, an insulating solid and/or an insulating fluid. In the example of FIG. 10, the cavity 324 is filled with a honeycomb material 326. The honeycomb material 326 provides additional structural support to the flange 316, while also allowing the lay-up of the shield and flange support 306 during the formation of the flange 316.

Figure 11:
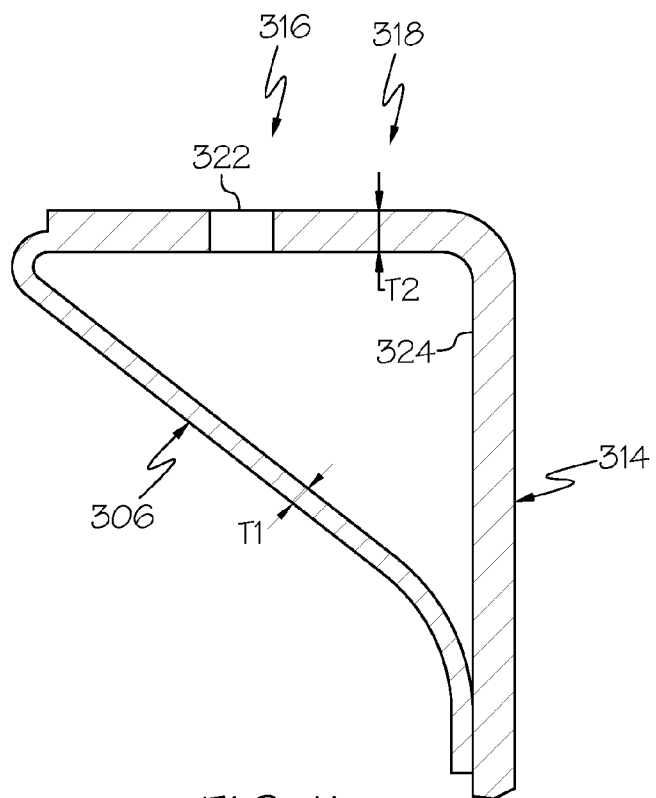
FIG. 11 is a cross-sectional view of the plenum of FIG. 9, taken along line 10-10 of FIG. 9.

With reference to FIG. 11, the cavity 324 defined by the first portion 318 and the shield and flange support 306 is filled with an insulating fluid, such as air. The insulating fluid provides additional protection for the flange 316 during an event. In the example of FIG. 11, the flange 316 can be formed using a salt mandrel method, in which the salt is removed or washed-out after curing to leave the cavity 324 filled with air.

Figure 12:
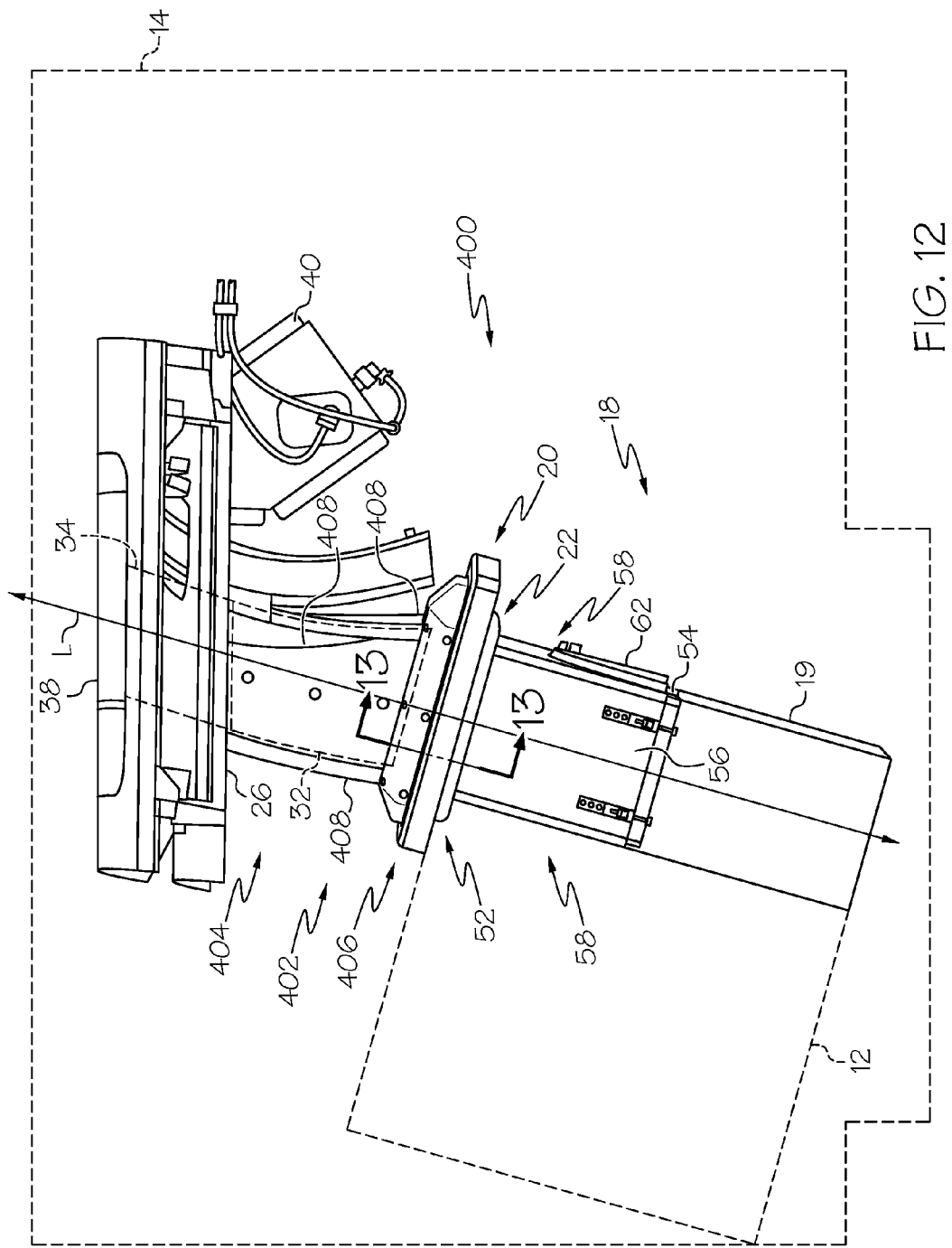
FIG. 12 is a schematic perspective illustration of a duct system that includes a shield and flange support in accordance with various embodiments.

With reference now to FIG. 12, a duct system 400 is shown. As the duct system 400 can be similar to the duct system 10 discussed with regard to FIGS. 1-6, only the differences between the duct system 10 and the duct system 400 will be discussed in detail herein, with the same reference numerals used to denote the same or substantially similar components.

With reference to FIG. 12, the duct system 400 is shown. The duct system 400 can be in communication with or employed with the APU 12, which can provide auxiliary power to the vehicle 14. The duct system 400 includes a first duct or inlet duct 402, the plenum 18 and the joint 20 between the inlet duct 402 and the plenum 18. As will be discussed in greater detail herein, one or more of the inlet duct 402, plenum 18 and the joint 20 includes the shield and flange support 22. Although the figures shown herein depict an example with certain arrangements of elements, additional intervening elements, devices, features, or components may be present in an actual embodiment. It should also be understood that FIG. 12 is merely illustrative and may not be drawn to scale.

The inlet duct 402 includes a body 404, which defines the first end 26 and a second end 406. The body 404 can be composed of any suitable material, such as a metal or polymer. In one example, the body 404 is composed of a composite polymeric material. The body 404 includes a plurality of sides 408 between the first end 26 and the second end 406, which cooperate to define the duct or passage 32 through the body 24 to enable fluid to flow through the inlet duct 402. In one example, the plurality of sides 408 are arranged to define a rectangular duct or passage 32, however, the plurality of sides 408 can be arranged to form any desired polygonal shape. Further, the body 404 need not include a plurality of sides 408, but can also be annular, circular or cylindrical, with a single side. Thus, the inlet duct 402 illustrated herein is merely exemplary.

Figure 13:
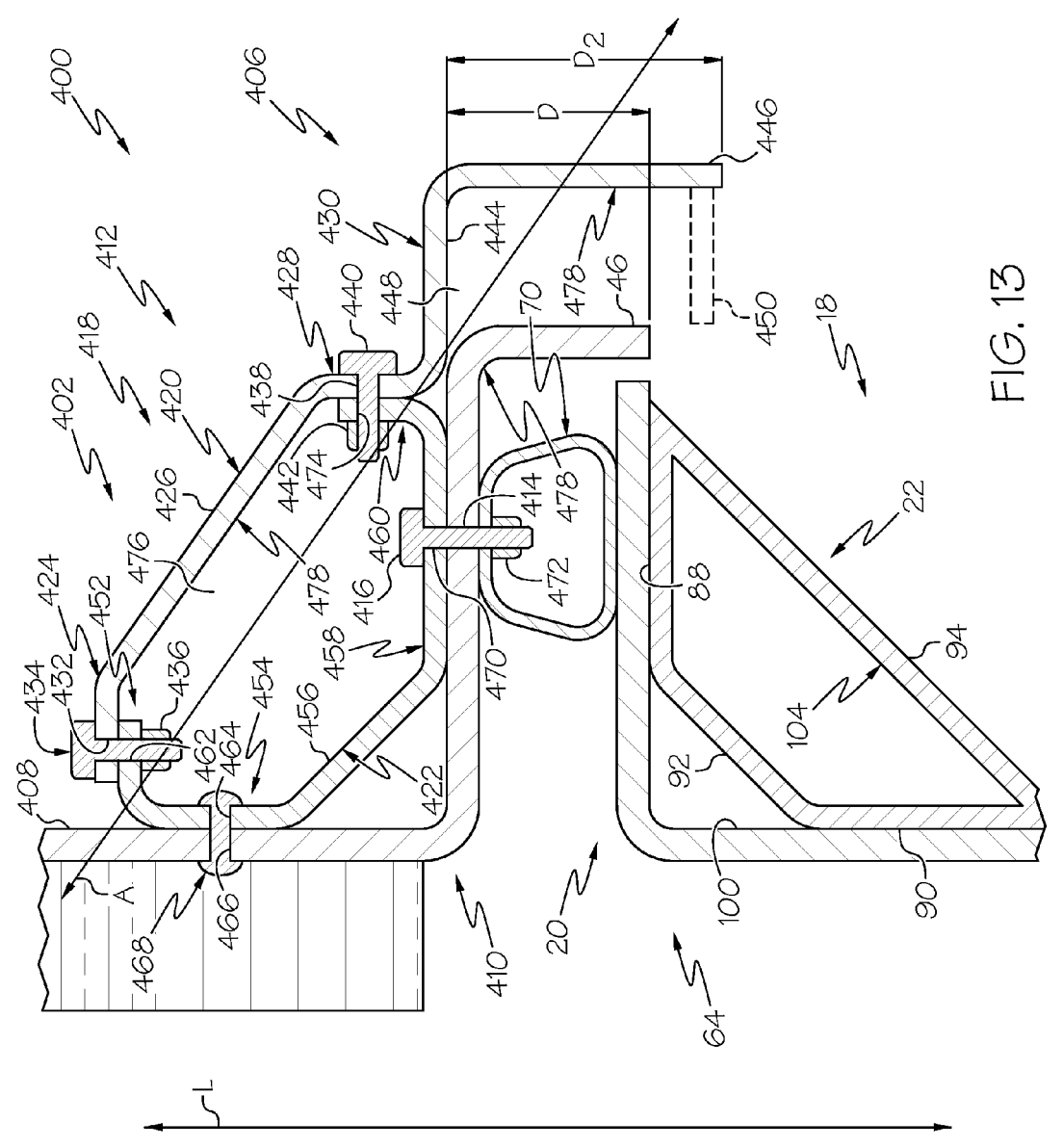

The second end 406 of the body 404 is coupled to the joint 20. In one example, with reference to FIG. 13, the second end 406 includes an outwardly extending flange 410 and a second shield and flange support 412. The flange 410 can be integrally formed from a terminal portion of one or more of the plurality of sides 408 of the body 404. In this example, the flange 410 extends outwardly from the second end 406 of the body 404 at about a 90 degree angle, however, the flange 410 can extend outwardly from the second end 406 at any suitable angle. The flange 410 couples the second end 406 of the body 404 to the plenum 18 at the joint 20, thereby enabling fluid to flow from the inlet 34, through the passage 32 and into the plenum 18.

In one example, the flange 410 includes one or more throughbores 414 and the overhang 46. The throughbores 414 are sized and shaped to receive a suitable fastener to couple the flange 410 at the joint 20. In one example, each of the throughbores 414 receive a mechanical fastener 416, such as a bolt, however, it should be understood that the flange 410 can be coupled at the joint 20 via any suitable technique, such as riveting, adhesives, etc. Thus, the use of mechanical fasteners 416 is merely exemplary.

The second shield and flange support 412 is coupled to the flange 410 of the second end 406 of the inlet duct 402 to provide additional rigidity to the flange 410 and to also shield the flange 410, and thus, the seal 70 during an event. The second shield and flange support 412 includes a body 418, which is sized to extend about the second end 406 of the inlet duct 402 adjacent to the flange 410. The body 418 can be formed of any suitable material, such as a metal or polymer. In one example, the body 418 is composed of a composite polymer. The body 418 generally extends along the longitudinal axis A, which is substantially transverse to the longitudinal axis L of the duct system 400.

The body 418 extends about the second end 406 of the inlet duct 402. Generally, the body 418 forms a closed perimeter about the second end 406, but the body 418 can have an open perimeter, if desired. In one example, the body 418 includes a first body portion 420 and a second body portion 422. The first body portion 420 is removably coupled to the second body portion 422 to enable the first body portion 420 to be removed to access the mechanical fastener 416 to repair or remove the seal 70. It should be noted that while the body 418 is described and illustrated herein as including two portions, the body 418 can have any number of portions and can be a single piece, if desired. Further, it should be noted that the body 418 can be composed of a plurality of sections, such as the plurality of sections 82a-82d discussed with regard to FIGS. 1-6, which are not illustrated herein for the sake of clarity.

The first body portion 420 includes a first segment 424, a second segment 426, a third segment 428 and a fourth segment 430. The first segment 424 is substantially planar, and extends substantially parallel to the flange 410. The first segment 424 defines a bore 432. The bore 432 receives a suitable fastener, such as a mechanical fastener 434. The mechanical fastener 434 cooperates with a nut 436 of the second body portion 422 to couple the first body portion 420 to the second body portion 422. It should be noted that the use of a mechanical fastener 434 and nut 436 is merely exemplary, as the first body portion 420 can be coupled to the second body portion 422 through any suitable technique, such as riveting.

The second segment 426 couples the first segment 424 to the third segment 428. The second segment 426 extends generally transverse to the longitudinal axis L of the duct system 400. The third segment 428 extends substantially parallel to the longitudinal axis L. The third segment 428 defines a bore 438. The bore 438 receives a suitable fastener, such as a mechanical fastener 440. The mechanical fastener 440 cooperates with a nut 442 of the second body portion 422 to couple the first body portion 420 to the second body portion 422. It should be noted that the use of a mechanical fastener 440 and nut 442 is merely exemplary, as the first body portion 420 can be coupled to the second body portion 422 through any suitable technique, such as riveting. Further, the mechanical fastener 434 and nut 436 can be substantially similar to the mechanical fastener 440 and nut 442, if desired.

The fourth segment 430 is coupled to the third segment 428. The fourth segment 430 includes a planar portion 444 and an overhang portion 446. The planar portion 444 is coupled to the third segment 428, and extends for a distance beyond an end of the flange 410. The planar portion 444 extends substantially parallel with the flange 410, and the overhang portion 446 extends downwardly, or towards the plenum 18, from the planar portion 444. The overhang portion 446 generally extends for a distance D2, which is greater than the distance D of the overhang 46. The overhang portion 446 provides an additional shield to protect the seal 70 during an event. Further, as the planar portion 444 extends for a distance beyond the flange 410, the overhang portion 446 is spaced apart from the overhang 46 of the flange 410, and thus, provides a channel 448 for receipt of an insulating fluid, such as air. It should be noted that the fourth segment 430 can also include an optional projection 450. The optional projection 450 further defines the channel 448 to aid in protecting the seal 70 during an event. It should be noted that while the optional projection 450 is illustrated herein as extending substantially perpendicular to the overhang portion 446, the optional projection 450 can extend at any suitable angle to the overhang portion 446, and can extend along an axis transverse to an axis defined by the overhang projection 446.

The second body portion 422 includes a first segment 452, a second segment 454, a third segment 456, a fourth segment 458 and a fifth segment 460. The first segment 452 is substantially planar, and extends substantially parallel to the flange 410. The first segment 452 defines a bore 462. The bore 462 is coaxially aligned with the bore 432 of the first body portion 420, when the first body portion 420 is coupled to the second body portion 422. The bore 462 receives a suitable fastener, such as the mechanical fastener 434. The mechanical fastener 434 cooperates with the nut 436, which is coupled about the bore 462 to couple the first body portion 420 to the second body portion 422.

The second segment 454 couples the first segment 452 to the third segment 456. The second segment 454 extends generally parallel to the longitudinal axis L of the duct system 400. The second segment 454 defines a bore 464. The bore 464 is coaxially aligned with a bore 466 of a respective one of the plurality of sides 408 of the inlet duct 402. The bore 466 receives a suitable fastener, such as a rivet 468. The rivet 468 couples the second body portion 422 to the second end 406 of the inlet duct 402. It should be noted that the use of the rivet 468 is merely exemplary, as the second body portion 422 can be coupled to the inlet duct 402 through any suitable technique, such as through the use of mechanical fasteners.

The third segment 456 couples the second segment 454 to the fourth segment 458. The third segment 456 extends generally transverse to the longitudinal axis L of the duct system 400. The fourth segment 458 defines a bore 470. The bore 470 is coaxially aligned with a respective one of the throughbores 414 of the flange 410 when the second body portion 422 is coupled to the flange 410. The bore 470 receives a suitable fastener, such as the mechanical fastener 416. The mechanical fastener 416 cooperates with a nut 472 of the seal 70 to couple the second body portion 422 to the seal 70 at the joint 20. It should be noted that the use of a mechanical fastener 416 and nut 472 is merely exemplary, as the second body portion 422 can be coupled at the joint 20 through any suitable technique, such as riveting.

The fifth segment 460 extends generally parallel to the longitudinal axis L and defines a bore 474. The bore 474 is coaxially aligned with the bore 438 of the first body portion 420, when the first body portion 420 is coupled to the second body portion 422. The bore 474 receives a suitable fastener, such as the mechanical fastener 440. The mechanical fastener 440 cooperates with the nut 442, which is coupled about the bore 474 to couple the first body portion 420 to the second body portion 422.

The first body portion 420 and the second body portion 422 cooperate to define a cavity 476. Stated another way, the body 418 of the second shield and flange support 412 is hollow, and defines the cavity 476. The cavity 476 can be filled with a suitable insulating fluid, such as air. It should be noted that the cavity 476 can also be filled with an insulating solid, such as a solid fire retardant material and can be filled with a suitable combination of an insulating solid and an insulating fluid. For example, the cavity 476 can be filled with ceramic, vermiculite, basalt, mica, graphite, and/or any suitable fire retardant material. Further, the cavity 476 can include combinations of solid fire retardant material, if desired.

In addition, one or more of the first body portion 420 and the second body portion 422 can include a coating 478. In one example, the coating 478 is a fire retardant coating, such as an intumescent paint, an ablative coating, etc. The coating 478 can be applied on an interior or exterior surface of one or more of the second segment 426 of the first body portion 420 within the cavity 476, the overhang 46 of the flange 410, and an interior surface of the overhang portion 446 of the second body portion 422 facing the flange 410. For the ease of illustration, the coating 478 is not illustrated herein, but it should be understood that the coating 478 can be applied to all or a portion of one or more of the surfaces, interior or exterior, of the first body portion 420, the second body portion 422 and the flange 410.

Figure 14:
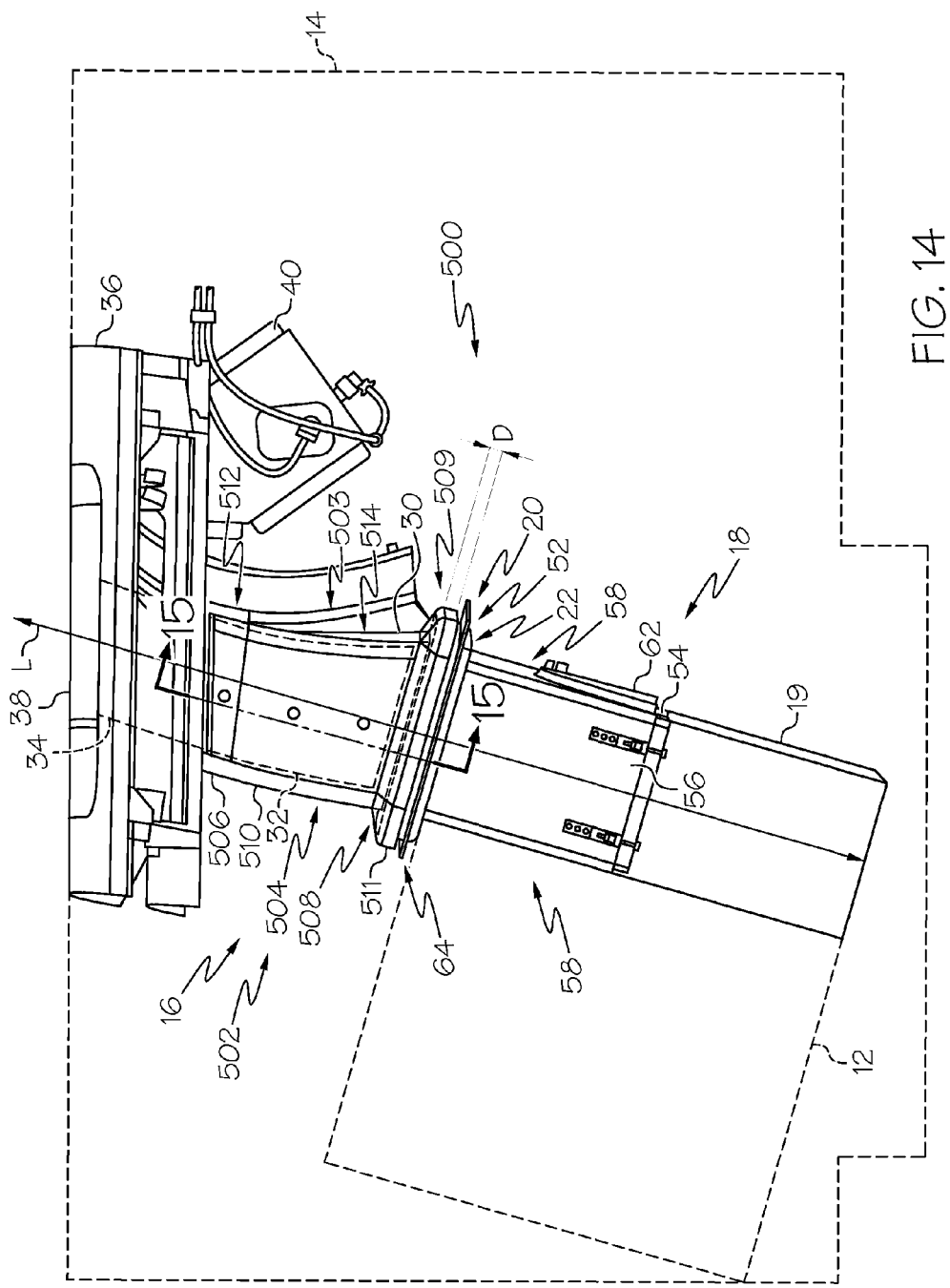
FIG. 14 is a schematic perspective illustration of a duct system that includes a shield and flange support in accordance with various embodiments.

With reference now to FIG. 14, a duct system 500 is shown. As the duct system 500 can be similar to the duct system 10 discussed with regard to FIGS. 1-6, only the differences between the duct system 10 and the duct system 500 will be discussed in detail herein, with the same reference numerals used to denote the same or substantially similar components.

The duct system 500 can be in communication with or employed with the APU 12, which can provide auxiliary power to the vehicle 14. The duct system 500 includes a first duct or inlet duct 502, the plenum 18 and the joint 20 between the inlet duct 502 and the plenum 18. As will be discussed in greater detail herein, one or more of the inlet duct 16, plenum 18 and the joint 20 includes a shield and flange support 503. Although the figures shown herein depict an example with certain arrangements of elements, additional intervening elements, devices, features, or components may be present in an actual embodiment. It should also be understood that FIG. 14 is merely illustrative and may not be drawn to scale.

The inlet duct 502 includes a body 504, which defines a first end 506 and a second end 508. The body 504 can be composed of any suitable material, such as a metal or polymer. In one example, the body 504 is composed of a composite polymeric material. The body 504 includes a plurality of sides 510 between the first end 506 and the second end 508. The plurality of sides 510 cooperate to define the duct or passage 32 through the body 504 to enable fluid to flow through the inlet duct 502, and the shield and flange support 503 is also coupled to one or more of the plurality of sides 510. In one example, the plurality of sides 510 are arranged to define the rectangular duct or passage 32, however, the plurality of sides 510 can be arranged to form any desired polygonal shape. Further, the body 504 need not include a plurality of sides 510, but can also be annular, circular or cylindrical, with a single side. Thus, the inlet duct 502 illustrated herein is merely exemplary.

The first end 506 of the body 504 is coupled to the inlet 34. The second end 508 of the body 504 is coupled to the joint 20 and includes an outwardly extending flange 509. The flange 509 can be integrally formed from a terminal portion of one or more of the plurality of sides 510 of the body 504. In this example, the flange 509 extends outwardly from the second end 508 of the body 504 at about a 90 degree angle, however, the flange 509 can extend outwardly from the second end 508 at any suitable angle. The flange 509 couples the second end 508 of the body 504 to the plenum 18 at the joint 20, thereby enabling fluid to flow from the inlet 34, through the passage 32 and into the plenum 18.

Figure 15:
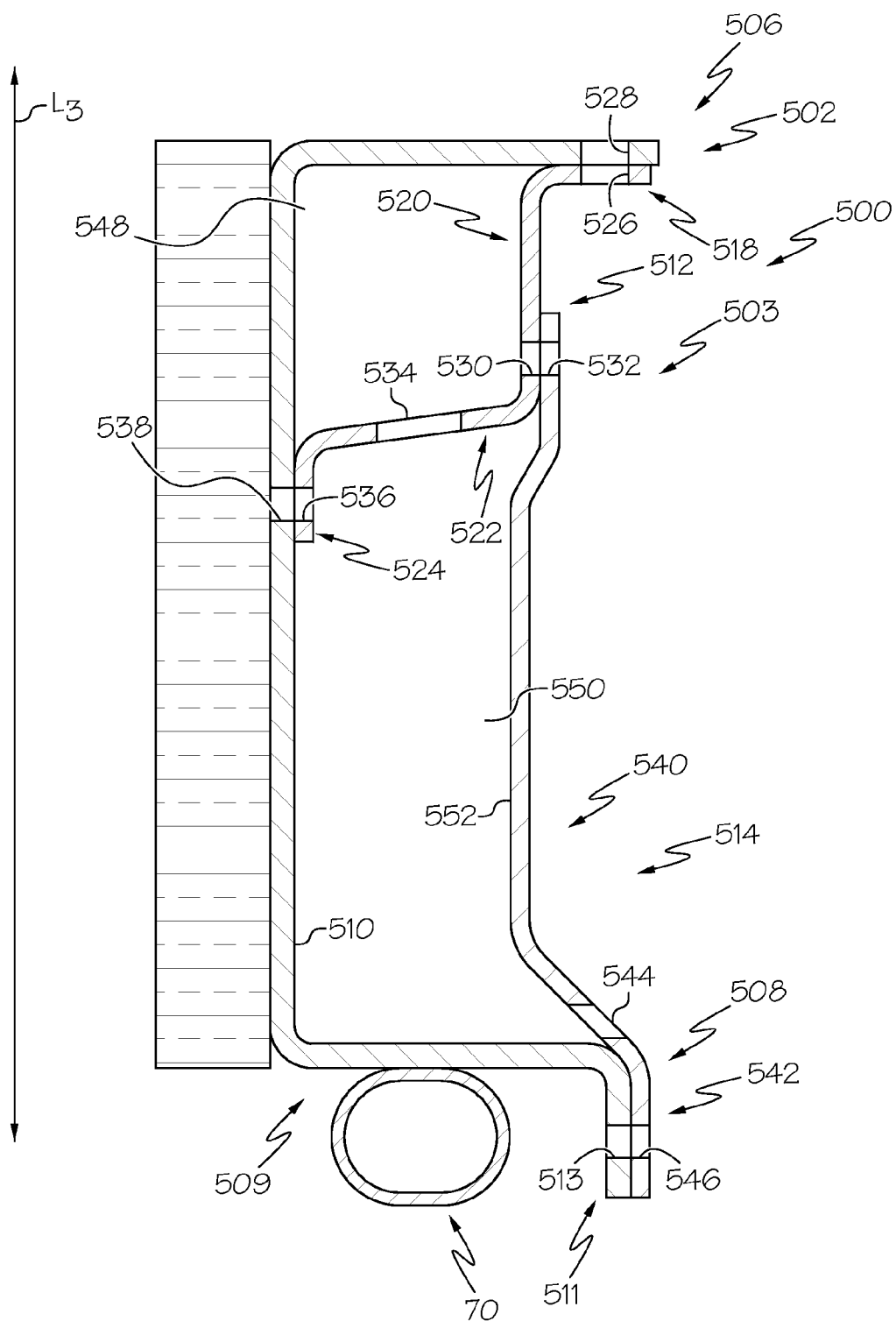
FIG. 15 is a cross-sectional view of an inlet duct of the duct system of FIG. 14, taken along line 15-15 of FIG. 14.

In one example, the flange 509 includes an overhang 511. The overhang 511 extends substantially downward from the flange 509, in a direction towards the plenum 18. Stated another way, the overhang 511 is substantially parallel to the longitudinal axis L defined through the duct system 500. In one example, the overhang 511 extends downward for a distance D to partially enclose a portion of the joint 20. It should be noted that the overhang 511 can extend downwardly for any desired distance, and thus, the distance D is merely exemplary. The overhang 511 can act as a drip shield, which can conduct fluid, such as water from condensation, down and away from the duct system 500. With reference to FIG. 15, the overhang 511 can define a bore 513, which can couple a portion of the shield and flange support 503 to the second end 508 of the body 504.

In this regard, the first end 506 and the second end 508 are each coupled to the shield and flange support 503. The shield and flange support 503 is coupled to the first end 506 and the second end 508 of the body 504 so as to extend along one or more of the plurality of sides 510 of the inlet duct 502.

The shield and flange support 503 can be formed of any suitable material, such as a metal or polymer. In one example, the shield and flange support 503 is composed of a composite polymer. The shield and flange support 503 includes a first body portion 512 and a second body portion 514. It should be noted that the shield and flange support 503 can be comprised of multiple first body portions 512 and second body portions 514, which can be arranged in an overlapping fashion about a perimeter of the body 504. For example, the first body portion 512 and the second body portion 514 can be arranged about the body 504 such adjacent ones of the first body portion 512 and the second body portion 514 overlap at the first segment 518 and second segment 520 of the first body portion 512, and overlap at the first segment 540 and the second segment 542 of the second body portion 514. One or more mechanical fasteners, such as bolts, can be inserted into throughbores defined at the overlap to couple the adjacent first body portions 512 and second body portions 514 together. It should be noted that the use of multiple first body portions 512 and second body portions 514 is merely exemplary, as the first body portion 512 and the second body portion 514 can be comprised of a single piece that surrounds the perimeter of the body 506.

The first body portion 512 is coupled to the first end 506. The first body portion 512 includes a first segment 518, a second segment 520, a third segment 522 and a fourth segment 524. The first segment 518 extends substantially perpendicular to a longitudinal axis L3 of the inlet duct 502. The first segment 518 defines a bore 526 for receipt of a suitable fastener. The bore 526 can be coaxially aligned with a bore 528 defined in the first end 506 of the inlet duct 502. In one example, the bore 526 and bore 528 can receive a mechanical fastener, such as a bolt, to couple the first body portion 512 to the first end 506 of the inlet duct 502. It should be understood, however, that any suitable technique can be employed to couple the first body portion 512 to the inlet duct 502, such as riveting.

The second segment 520 is coupled to the first segment 518 and the third segment 522. The second segment 520 extends substantially parallel to the longitudinal axis L3 of the inlet duct 502, and defines a bore 530 for receipt of a suitable fastener. The bore 530 can be coaxially aligned with a bore 532 defined in the second body portion 514. In one example, the bore 530 and bore 532 can receive a mechanical fastener, such as a bolt, to removably couple the first body portion 512 to the second body portion 514. It should be understood, however, that any suitable technique can be employed to removably couple the first body portion 512 to the second body portion 514, such as riveting. By removably coupling the first body portion 512 to the second body portion 514, the second body portion 514 can be removed to enable repair or replacement of the seal 70.

The third segment 522 extends substantially transverse to the longitudinal axis L3 of the inlet duct 502. The third segment 522 defines an access throughbore 534. The access throughbore 534 can allow access to uncouple the flange 506 from the inlet 34. The fourth segment 524 extends substantially parallel to the longitudinal axis L3 of the inlet duct 502. The fourth segment 524 is coupled to the third segment 522 and defines a bore 536 for receipt of a suitable fastener. The bore 536 can be coaxially aligned with a bore 538 defined in a respective one of the plurality of sides 510 of the inlet duct 502. In one example, the bore 536 and bore 538 can receive a mechanical fastener, such as a bolt, to couple the first body portion 512 to the respective one of the plurality of sides 510 of the inlet duct 502. It should be understood, however, that any suitable technique can be employed to couple the first body portion 512 to the inlet duct 502, such as riveting.

The second body portion 514 is removably coupled to the first body portion 512, and to the second end 508 of the inlet duct 502. The second body portion 514 includes a first segment 540 and a second segment 542. The first segment 540 is substantially planar, and extends substantially parallel to the longitudinal axis L3. The first segment 540 includes the bore 532, which is defined near a terminal end of the first segment 540.

The first segment 540 is coupled to the second segment 542. The second segment 542 extends outwardly away from the first segment 540, in a direction away from the respective one of the plurality of sides 510 of the body 504. The second segment 542 generally includes a slight curvature, so that the second segment 542 can extend along a side of the overhang 511 of the flange 509. The second segment 542 defines a drain aperture 544 and a bore 546. The drain aperture 544 allows fluid, such as condensation, to drain away from the inlet duct 502. The bore 546 receives a suitable fastener, such as a mechanical fastener, to couple the second body portion 514 to the overhang 511 of the flange 509. Thus, the bore 546 can be coaxially aligned with the bore 513 of the flange 509. It should be understood, that any suitable technique can be employed to couple the second body portion 514 to the inlet duct 502, such as riveting, and thus, the use of the bores 513, 546 and a mechanical fastener is merely exemplary.

The first body portion 512 and the second body portion 514 can cooperate to define a first cavity 548 and a second cavity 550. One or more of the first cavity 548 and the second cavity 550 can be filled with a suitable insulating fluid, such as air. It should be noted that one or more the first cavity 548 and second cavity 550 can also be filled with an insulating solid, such as a solid fire retardant material and can be filled with a suitable combination of an insulating solid and an insulating fluid. For example, one or more of the first cavity 548 and second cavity 550 can be filled with ceramic, vermiculite, basalt, mica, graphite, and/or any suitable fire retardant material. Further, one or more of the first cavity 548 and second cavity 550 can include combinations of solid fire retardant material, if desired.

In addition, one or more of the first body portion 512 and the second body portion 514 can include a coating 552. In one example, the coating 552 is a fire retardant coating, such as an intumescent paint, an ablative coating, etc. The coating 552 can be applied on an interior surface of one or more of the first body portion 512 within the first cavity 548 and a surface of the first segment 540 of the second body portion 514 within the second cavity 550. For the ease of illustration, the coating 552 is not illustrated herein, but it should be understood that the coating 552 can be applied to all or a portion of one or more of the surfaces of the first body portion 512 and the second body portion 514. Further, the coating 552 can be applied to one or more of the plurality of sides 510 of the inlet duct 502 within the first cavity 548 and the second cavity 550.

Figure 16:
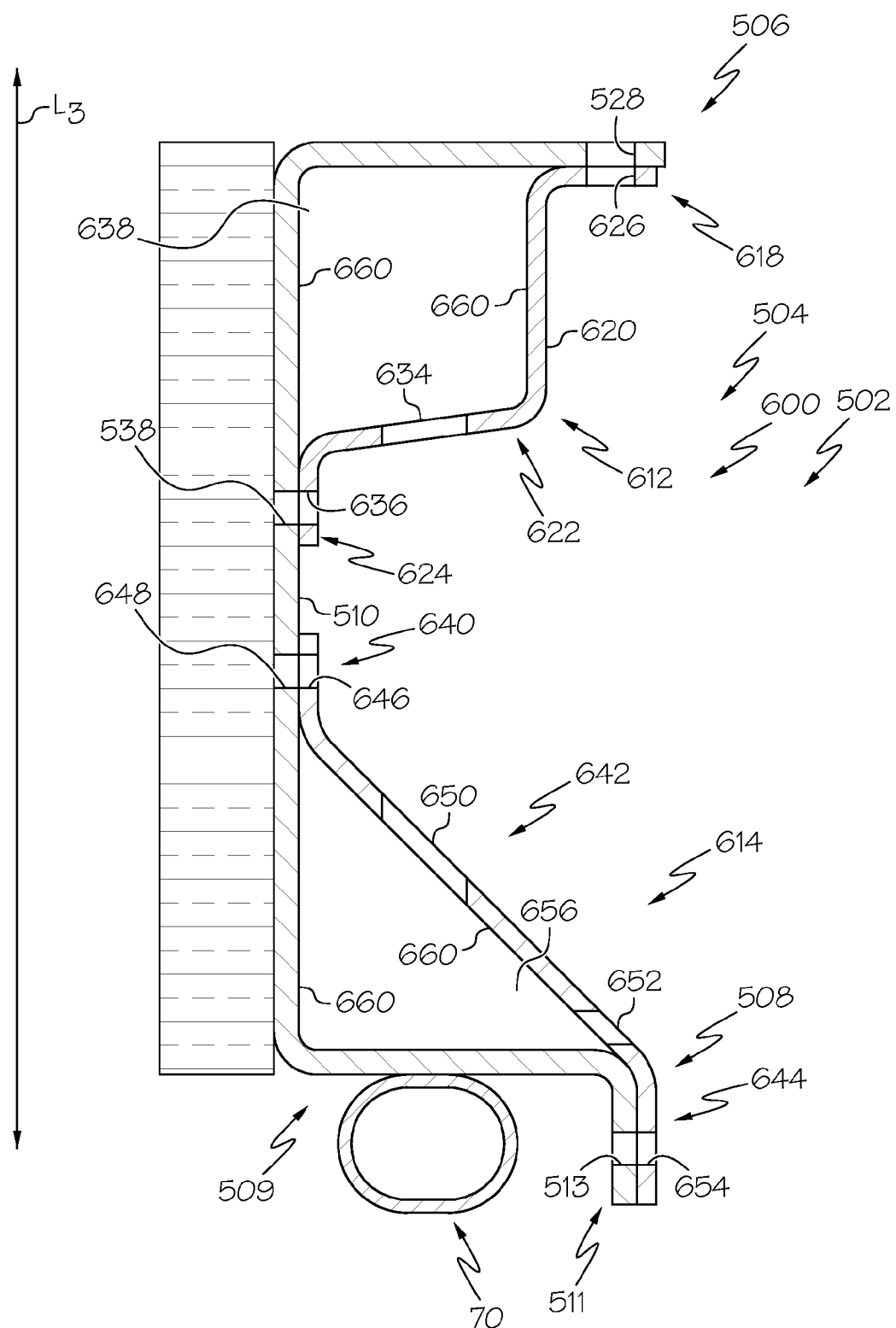
FIG. 16 is a cross-sectional view of an inlet duct of the duct system of FIG. 14, taken along line 15-15 of FIG. 14.

It should further be noted that the shield and flange support 503 need not have the shape illustrated in FIG. 15. For example, with reference to FIG. 16, the inlet duct 502 can include a shield and flange support 600. The shield and flange support 600 is coupled to the first end 506 and the second end 508 of the body 504 so as to extend along one or more of the plurality of sides 510 of the inlet duct 502. The shield and flange support 600 can be formed of any suitable material, such as a metal or polymer. In one example, the shield and flange support 600 is composed of a composite polymer. In this example, the shield and flange support 600 includes a first body portion 612 and a second body portion 614.

The first body portion 612 is coupled to the first end 506. The first body portion 612 includes a first segment 618, a second segment 620, a third segment 622 and a fourth segment 624. The first segment 618 extends substantially perpendicular to the longitudinal axis L3 of the inlet duct 502. The first segment 618 defines a bore 626 for receipt of a suitable fastener. The bore 626 can be coaxially aligned with the bore 528 defined in the first end 506 of the inlet duct 502. In one example, the bore 626 and bore 528 can receive a mechanical fastener, such as a bolt, to couple the first body portion 612 to the first end 506 of the inlet duct 502. It should be understood, however, that any suitable technique can be employed to couple the first body portion 612 to the inlet duct 502, such as riveting.

The second segment 620 is coupled to the first segment 618 and the third segment 622. The second segment 620 extends substantially parallel to the longitudinal axis L3 of the inlet duct 502. The third segment 622 extends substantially transverse to the longitudinal axis L3 of the inlet duct 502. The third segment 622 defines an access throughbore 634. The access throughbore 634 can allow access to the first end 506 of the inlet duct 502. The fourth segment 624 extends substantially parallel to the longitudinal axis L3 of the inlet duct 502. The fourth segment 624 is coupled to the third segment 622 and defines a bore 636 for receipt of a suitable fastener. The bore 636 can be coaxially aligned with the bore 538 defined in a respective one of the plurality of sides 510 of the inlet duct 502. In one example, the bore 636 and bore 538 can receive a mechanical fastener, such as a bolt, to couple the first body portion 612 to the respective one of the plurality of sides 510 of the inlet duct 502. It should be understood, however, that any suitable technique can be employed to couple the first body portion 612 to the inlet duct 502, such as riveting.

The first body portion 612 defines a first cavity 638. The first cavity 638 can be filled with a suitable insulating fluid, such as air. It should be noted that the first cavity 638 can also be filled with an insulating solid, such as a solid fire retardant material and can be filled with a suitable combination of an insulating solid and an insulating fluid. For example, the first cavity 638 can be filled with ceramic, vermiculite, basalt, mica, graphite, and/or any suitable fire retardant material. Further, the first cavity 638 can include combinations of solid fire retardant material, if desired.

The second body portion 614 is coupled to the second end 508 of the inlet duct 502. The second body portion 614 includes a first segment 640, a second segment 642 and a third segment 644. The first segment 640 is substantially planar, and extends substantially parallel to the longitudinal axis L3. The first segment 640 defines a bore 646, which is defined near a terminal end of the first segment 640. The bore 646 can receive a suitable fastener. The bore 646 can be coaxially aligned with a bore 648 defined in a respective one of the plurality of sides 510 of the inlet duct 502. In one example, the bore 646 and bore 648 can receive a mechanical fastener, such as a bolt, to couple the second body portion 614 to the respective one of the plurality of sides 510 of the inlet duct 502. It should be understood, however, that any suitable technique can be employed to couple the second body portion 614 to the inlet duct 502, such as riveting.

The second segment 642 is coupled to the first segment 640, and extends substantially transverse to the longitudinal axis L3 of the inlet duct 502. The second segment 642 defines an access aperture 650 and a drain aperture 652. The access aperture 650 allows for access to the seal 70. The drain aperture 652 allows fluid, such as condensation, to drain away from the inlet duct 502.

The third segment 644 is coupled to the second segment 642. The third segment 644 extends substantially parallel to the longitudinal axis L3. The third segment 644 defines a bore 654. The bore 654 receives a suitable fastener, such as a mechanical fastener, to couple the second body portion 614 to the overhang 511 of the flange 509. Thus, the bore 654 can be coaxially aligned with the bore 513 of the flange 509. It should be understood, that any suitable technique can be employed to couple the second body portion 614 to the inlet duct 502, such as riveting, and thus, the use of the bores 513, 654 and a mechanical fastener is merely exemplary.

The second body portion 614 defines a second cavity 656. The second cavity 656 can be filled with a suitable insulating fluid, such as air. It should be noted that the second cavity 656 can also be filled with an insulating solid, such as a solid fire retardant material and can be filled with a suitable combination of an insulating solid and an insulating fluid. For example, the second cavity 656 can be filled with ceramic, vermiculite, basalt, mica, graphite, and/or any suitable fire retardant material. Further, the second cavity 656 can include combinations of solid fire retardant material, if desired.

In addition, one or more of the first body portion 612 and the second body portion 614 can include a coating 660. In one example, the coating 660 is a fire retardant coating, such as an intumescent paint, an ablative coating, etc. The coating 660 can be applied on an interior surface of one or more of the first body portion 612 within the first cavity 638 and a surface of the second body portion 614 within the second cavity 656. For the ease of illustration, the coating 660 is not illustrated herein, but it should be understood that the coating 660 can be applied to all or a portion of one or more of the surfaces of the first body portion 612 and the second body portion 614. Further, the coating 660 can be applied to one or more of the plurality of sides 510 of the inlet duct 502 within the first cavity 638 and the second cavity 656.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:
1. A duct system, comprising:
   a duct having a plenum including a first end and a second end, with a plurality of sides between the first end and the second end, the first end including a flange that extends outwardly away from the first end and the plenum extends along a longitudinal axis;
   a shield and flange support for the duct including a body having a first side, a second side, a third side, a fourth side and defining a cavity;
   the first side is coupled to the flange about the first end;

the second side is coupled to the first side to extend toward the plurality of sides of the plenum, the second side interconnects the first side and the third side;

the third side is coupled to the plurality of sides of the plenum about the first end and is coupled to the second side;

the fourth side interconnects the third side and the first side, and the fourth side is substantially transverse to the longitudinal axis; and the first side, the second side, the third side and the fourth side cooperate to enclose the cavity, the cavity including at least one of a first insulating fluid and a first insulating solid and the fourth side is spaced apart from the flange and the plurality of sides of the plenum to define a gap between the body and the plenum for receipt of at least one of a second insulating fluid and a second insulating solid.

2. The duct system of claim 1, wherein the body is discrete from the flange.

3. The duct system of claim 2, wherein the body includes a plurality of sections that are coupled together to extend about a perimeter of the first end of the plenum.

4. The duct system of claim 1, wherein the cavity is filled with a honeycomb material.

5. The duct system of claim 1, wherein the shield and flange support comprises a first body portion and a second body portion, with the first body portion including the first side and the second body portion including the second side.

6. The duct system of claim 5, wherein the first body portion is removably coupled to the second body portion.

7. The duct system of claim 1, wherein the duct is an inlet duct.

8. The duct system of claim 1, wherein the second side includes an overhang portion, and the overhang portion extends beyond an end of the flange.

9. The duct system of claim 1, wherein at least one of the first side, the second side, the third side and the fourth side include a coating.

10. A duct system, comprising:
a duct having a plenum including a first end and a second end, with a plurality of sides between the first end and the second end, the first end including a flange that extends outwardly away from the first end about a perimeter of the first end and the plenum extends along a longitudinal axis;
a shield and flange support for the duct including a body having a plurality of sides that cooperate to enclose a cavity, with a first one of the plurality of sides coupled to the flange, the first one of the plurality of sides is substantially perpendicular to the longitudinal axis, a second one of the plurality of sides coupled to the plurality of sides of the plenum about the perimeter, the second one of the plurality of sides is substantially parallel to the longitudinal axis, a third one of the plurality of sides of the body is spaced apart from the flange and the plurality of sides of the plenum to define a gap between the body and the plenum, the third one of the plurality of sides interconnects the first one of the plurality of sides and the second one of the plurality of sides and extends along an axis transverse to the longitudinal axis, a fourth one of the plurality of sides interconnects the first one of the plurality of sides and the second one of the plurality of sides, the fourth one of the plurality of sides substantially opposite the third one of the plurality of sides, and the body is coupled to the flange and the duct such that the body extends along a second longitudinal axis substantially transverse to the longitudinal axis of the plenum.

11. The duct system of claim 10, wherein the body includes a plurality of sections, which are coupled together to define an area of overlap and to extend about the perimeter of the first end of the plenum.

12. The duct system of claim 10, wherein at least one of the plurality of sides includes a coating.

13. The duct system of claim 10, wherein at least one of a first insulating fluid and a first insulating solid are received in the cavity.

14. The duct system of claim 13, wherein the gap receives at least one of a second insulating fluid and a second insulating solid.

15. The duct system of claim 10, wherein one of the first one of the plurality of sides and the second one of the plurality of sides is removably coupled to the body.

16. A duct system, comprising:
a duct having a plenum including a first end and a second end, with a plurality of sides between the first end and the second end, the first end including a flange that extends outwardly away from the first end about a perimeter of the first end; and
a shield and flange support for the duct, the shield and flange support including:
a body that includes a first side, a second side, a third side and a fourth side, the first side coupled to the flange about the perimeter of the first end;
the second side coupled to the first side, and the second side interconnects the first side and the third side;
the third side coupled to the second side and to the plurality of sides of the plenum about the perimeter of the plenum; and
the fourth side interconnects the first side and the third side, the first side, the second side, the third side and the fourth side cooperating to enclose a cavity defined within the body, with at least one of a first insulating fluid and a first insulating solid received in the cavity, and the fourth side is spaced apart from the flange and the plurality of sides of the plenum to define a gap about the perimeter of the first end between the body and the plenum for receipt of at least one of a second insulating fluid and a second insulating solid.

17. The duct system of claim 16, wherein the first side, the second side, the third side and the fourth side form a section, and the shield and flange support includes a plurality of sections that are coupled together to extend about the perimeter of the first end of the plenum.

18. The duct system of claim 16, wherein at least one of the first side, the second side, the third side and the fourth side includes a coating.

* * * * *